(12) United States Patent
Murata

(10) Patent No.: US 8,461,768 B2
(45) Date of Patent: Jun. 11, 2013

(54) TRANSMITTER AND INFORMATION PROCESSING DEVICE CONVERTING SUPPLY VOLTAGE TO DRIVE VOLTAGE

(75) Inventor: Makoto Murata, Kyoto (JP)

(73) Assignee: Rohm Co., Ltd. (JP)

( * ) Notice: Subject to any disclaimer, the term of this patent is extended or adjusted under 35 U.S.C. 154(b) by 505 days.

(21) Appl. No.: 12/687,222

(22) Filed: Jan. 14, 2010

(65) Prior Publication Data

US 2010/0176748 A1 Jul. 15, 2010

(30) Foreign Application Priority Data

Jan. 14, 2009 (JP) ................................ P2009-006099
Jan. 14, 2009 (JP) ................................ P2009-006100
Jan. 14, 2009 (JP) ................................ P2009-006101
Dec. 4, 2009 (JP) ................................ P2009-276307

(51) Int. Cl.
*H05B 41/16* (2006.01)

(52) U.S. Cl.
USPC ........ 315/247; 315/185 S; 315/291; 315/312; 315/224

(58) Field of Classification Search
USPC ....... 315/247, 185 S, 224, 225, 291, 307–311
See application file for complete search history.

(56) References Cited

U.S. PATENT DOCUMENTS

| | | | |
|---|---|---|---|
| 7,759,881 B1 * | 7/2010 | Melanson | 315/307 |
| 2008/0088254 A1 * | 4/2008 | Yang | 315/247 |
| 2009/0134817 A1 * | 5/2009 | Jurngwirth et al. | 315/307 |
| 2009/0315473 A1 * | 12/2009 | Tsai et al. | 315/291 |
| 2012/0032613 A1 * | 2/2012 | Liu et al. | 315/297 |

FOREIGN PATENT DOCUMENTS

| | | |
|---|---|---|
| JP | 7-231303 A | 8/1995 |
| JP | 2003-163638 A | 6/2003 |
| JP | 2005-94909 A | 4/2005 |
| JP | 4005401 B2 | 8/2007 |
| JP | 2008-245263 | 10/2008 |

* cited by examiner

*Primary Examiner* — Tuyet Thi Vo
(74) *Attorney, Agent, or Firm* — Cantor Colburn LLP

(57) ABSTRACT

A transmitter includes a voltage conversion circuit converting supply voltage externally supplied into drive voltage and outputting the drive voltage; and an optical output unit which is supplied with the drive voltage and outputs an optical signal, wherein the voltage conversion circuit and the optical output unit are included in a same module.

20 Claims, 18 Drawing Sheets

TRANSMITTER AND INFORMATION PROCESSING DEVICE CONVERTING SUPPLY VOLTAGE TO DRIVE VOLTAGE

CROSS REFERENCE TO RELATED APPLICATIONS AND INCORPORATION BY REFERENCE

This application is based upon and claims the benefit of priority from prior Japanese Patent Application P2009-006099 filed on Jan. 14, 2009, prior Japanese Patent Application P2009-006100 filed on Jan. 14, 2009, prior Japanese Patent Application P2009-006101 filed on Jan. 14, 2009 and prior Japanese Patent Application P2009-276307 filed on Dec. 4, 2009; the entire contents of which are incorporated by reference herein.

BACKGROUND OF THE INVENTION

1. Field of the Invention

The present invention relates to a transmitter and an information processing device performing information transmission through optical communication.

2. Description of the Related Art

In many portable information processing devices such as mobile phones, a plurality of circuits having different source voltages necessary for operation are mounted. For example, a mobile phone operated with a built-in battery includes a control circuit performing information processing, a radio communication circuit, and peripheral circuits of a display, a camera, and the like, which are supplied with individual proper source voltages.

The development of the portable information processing devices is being conducted for the purposes of increasing operating time with the built-in battery or reducing the size and weight using a lower-capacity battery. Accordingly, it is required to reduce the power consumption of the portable information processing devices. It is therefore required to reduce the power consumption of each circuit and reduce the operating voltage of each circuit in the light of ensuring the operational margin for the voltage drop of the battery output.

While the operating voltage of each circuit is being reduced, for example, the operating voltage of a logic operating circuit such as a control circuit has reached 1.5 V or lower, and the operating voltage of an analogue circuit has reached about 2.5 V. In order to supply source voltages necessary for individual circuits, a method is proposed in which a power supply circuit generating various source voltages from the voltage supplied from the built-in battery is mounted on the information processing device.

In data transmission through a comparatively short distance within an information processing device or between information processing devices, in the case of transmitting a large volume of information such as image data, the information transmission is effectively performed through optical communication (hereinafter, referred to as optical transmission) in the light of reduction of electromagnetic interference (EMI), easy layout of transmission lines, and the like. However, the source voltage necessary for a light emitting element used for the optical transmission, such as a semiconductor laser, is about 3.3 V and is generally higher than the source voltage supplied to the other circuits of the information processing device.

It is therefore required to add a power supply circuit for the light emitting element to the information processing device conducting optical transmission. This will increase the manufacturing cost and mounting area of products. Moreover, there is a method of selectively using light emitting element operating at low voltage, but selection of the light emitting element will increase the cost and make it difficult to ensure stable supply thereof.

SUMMARY OF THE INVENTION

An aspect of the present invention is a transmitter includes a voltage conversion circuit converting supply voltage externally supplied into drive voltage and outputting the drive voltage; and an optical output unit which is supplied with the drive voltage and outputs an optical signal, wherein the voltage conversion circuit and the optical output unit are included in a same module.

Another aspect of the present invention is an information processing device includes a transmitter and a receiver comprising. The transmitter includes a voltage conversion circuit converting supply voltage externally supplied into drive voltage and outputting the drive voltage; an optical output unit which is supplied with the drive voltage and outputs an optical signal; a voltage setting circuit which controls the voltage conversion circuit according to terminal voltage of the light emitting element for setting the drive voltage; and a current setting circuit which receives an external feedback signal and sets the drive current of the light emitting element according to the feedback signal. The receiver includes a light receiving element receiving the optical signal; and a monitor circuit sending the feedback signal to the current setting circuit according to conducting current of the light receiving element.

DETAILED DESCRIPTION OF THE INVENTION

Figure 1:
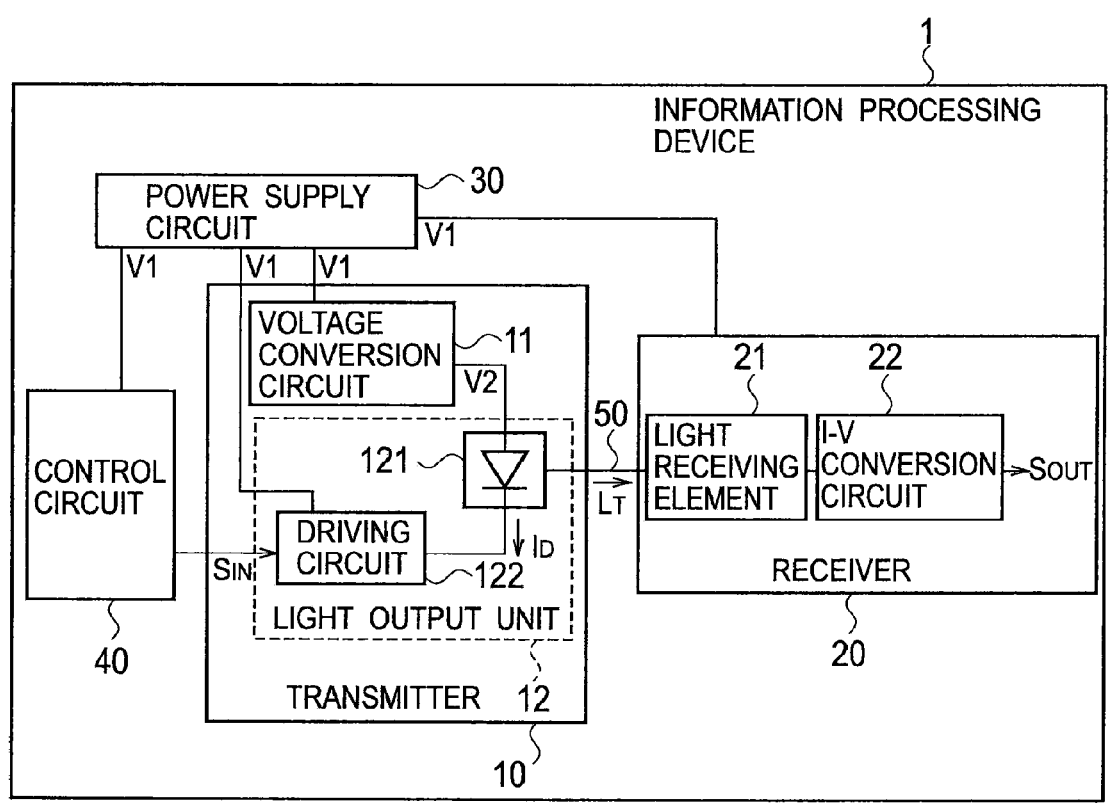
FIG. 1 is a schematic view showing a configuration of an information processing device including a transmitter according to a first embodiment of the present invention.

The first, second and third embodiments of the present invention will be described with reference to the accompanying drawings. In the following description of the drawings, the same or similar reference numerals are applied to the same or similar parts and elements. The following embodiments just show devices and methods to embody the technical idea of the present invention, and the technical idea of the present invention does not specify structures, and arrangements of the constituent components and the like to the following description. The technical idea of the present invention can be variously modified in the scope of claims.

First Embodiment

As shown in FIG. 1, a transmitter 10 according to a first embodiment of the present invention includes: a voltage conversion circuit 11 converting externally supplied supply voltage V1 into drive voltage V2 for output; and a light output unit 12 which is supplied with the drive voltage V2 and outputs an optical signal $L_T$. The voltage conversion circuit 11 and light output unit 12 are included in a same module. Herein, the module indicates a unit of functional elements which can be mounted on an information processing device or the like as a single electronic part. For example, the voltage conversion circuit 11 and light output unit 12 are mounted on a single package.

The light output unit 12 includes: a light emitting element 121 to which the drive voltage V2 is applied; and a driving circuit 122 setting drive current $I_D$ of the light emitting element 121. The light emitting element 121 can be a semiconductor laser, a light emitting diode (LED), or the like.

In the example shown in FIG. 1, it is assumed that the drive voltage V2 is higher than the supply voltage V1. In other words, the voltage conversion circuit 11 is a voltage increasing circuit generating the drive voltage V2 from the supply voltage V1.

The voltage conversion circuit 11 includes, for example, a charge pump circuit and a reference voltage generation circuit determining the voltage as a target of the voltage increasing operation. When the voltage generated by the voltage conversion circuit 11 reaches the desired drive voltage V2, the voltage conversion circuit 11 maintains the output voltage at the drive voltage V2. The voltage conversion circuit 11 is thus unnecessarily a voltage increasing circuit generating voltage equal to integer number times the supply voltage V1. Moreover, in order to stably output the drive voltage V2, the voltage conversion circuit 11 may further include a voltage regulator which receives increased voltage and outputs the drive voltage V2, such as a low dropout (LDO) regulator. The voltage conversion circuit 11 and light output unit 12 are mounted on an information processing device 1 as a single module. For example, the voltage conversion circuit 11 and light output unit 12 are integrated in a same semiconductor chip, or the voltage conversion circuit 11 and driving circuit 122 are integrated in a same semiconductor chip.

As shown in FIG. 1, the transmitter 10 is mounted on the information processing device 1. The information processing device 1 further includes a receiver 20, a power supply circuit 30, and a control circuit 40.

The optical signal $L_T$ outputted from the transmitter 10 is transmitted to the receiver 20 through an optical path 50. The optical path 50 is composed of an optical fiber, an optical waveguide, or the like. The receiver 20 converts the received optical signal $L_T$ into an electrical signal as an output signal $S_{OUT}$ for output. The receiver 20 shown in FIG. 1 includes: a light receiving element 21 receiving the optical signal $L_T$ and outputting current; and an I-V conversion circuit 22 converting the current outputted from the light receiving element 21 into voltage and outputting the output signal $S_{OUT}$. The light receiving element 21 can be a photodiode (PD) or the like.

The power supply circuit 30 supplies source voltages to the individual circuits included in the information processing device 1. In the example shown in FIG. 1, the source voltages supplied to the transmitter 10, receiver 20, and control circuit 40 are the supply voltage V1. The power supply circuit 30 may supply different voltages to the transmitter 10, receiver 20, and control circuit 40. For example, when the drive voltage V2 is 3.3 V, the power supply circuit 30 supplies 1.5 V to the control circuit 40 and 2.5 V to the transmitter and receiver 10 and 20. The source voltage of the power supply circuit 30 is supplied from a battery (not shown) built in the information processing device 1 or from the outside of the information processing device 1.

The control circuit 40 sends an input signal $S_{IN}$ to the transmitter 10. The input signal $S_{IN}$ is inputted to the driving circuit 122, and the driving circuit 122 sets drive current $I_D$ of the light emitting element 121 according to the input signal $S_{IN}$. The light output unit 12 then outputs the optical signal $L_T$ to the receiver 20 according to the input signal $S_{IN}$.

When a large volume of information such as image data is transmitted at high speed, employment of optical transmission is effective on reduction of EMI, easy layout of transmission lines, and the like. However, the source voltage necessary for the light emitting element used for optical transmission, such as a semiconductor laser, is generally higher than the source voltage supplied to the other circuits of the information processing device.

Specifically, in many cases, the source voltage operating a semiconductor laser used as the light emitting element 121 is higher than the source voltage necessary for operating the control circuit 40 and receiver 20 included in the information processing device 1. For example, in some cases, the supply voltage V1 supplied to the control circuit and receiver 40 and 20 is 2.5 V, while the drive voltage V2, which is necessary for operating a semiconductor laser as the light emitting element 12, is 3.3 V. In this case, the light emitting element 121 can be operated by adding a power supply circuit supplying the drive voltage V2 to the information processing device 1, for example.

However, adding a new power circuit will increase the manufacturing cost and mounting area of products. Furthermore, the drive voltage of the semiconductor laser needs to be properly set according to the characteristic of each light emitting element. The additional power supply circuit therefore needs to be designed according to the characteristic of each light emitting element.

On the other hand, the transmitter 10 shown in FIG. 1 incorporates the voltage conversion circuit 11 converting the supply voltage V1 into the drive voltage V2 for output. It is therefore unnecessary to mount another power supply circuit on the information processing device 1. This makes it possible to reduce the number of parts and mounting area at manufacturing of the information processing device 1.

Moreover, the light output unit 12 including the light emitting element 121 and the voltage conversion circuit 11 constitute a single module (the transmitter 10). Accordingly, at manufacturing of the information processing devices, common parts can be used for the receiver 20, power supply circuit 30, and control circuit 40, other than the transmitter 10, thus reducing the manufacturing cost. For example, common parts other than the transmitter 10 can be used for an information processing device using optical transmission and an information processing device not using optical transmission.

Generally, the drive voltage V2 is set according to the characteristic of the semiconductor laser or the like used as the light emitting element 121. In the transmitter 10 shown in FIG. 1, the voltage conversion circuit 11 and light output unit 12 optimal for the used light emitting element 121 are made into a module. Accordingly, the light emitting element 121 can output the optical signal $L_T$ in an optimal operating condition regardless of the value of the supply voltage V1. In other words, by incorporating the transmitter 10 in the voltage conversion circuit 11, the supply voltage V1 supplied to the transmitter 10 can be set equal among a plurality of information processing devices even when the necessary drive voltage V2 varies from information processing device to device due to the characteristic variation of the light emitting element 121 and light output unit 12. As a result, the burden of designing a set and a power supply circuit are reduced, and the manufacturing cost are also reduced.

The transmitter 10 according to the first embodiment of the present invention is suitable for transmitting a large volume of information at high speed (for example, 1 to 2.5 Gbps) within the information processing device or in the case where the transmission distance between information processing devices is comparatively short. The transmitter 10 shown in FIG. 1 is preferable not only in the case of data transfer at high speed but also in the case where the optical transmission is effective on reduction of EMI, easy layout of transmission lines, and the like.

Figure 2:
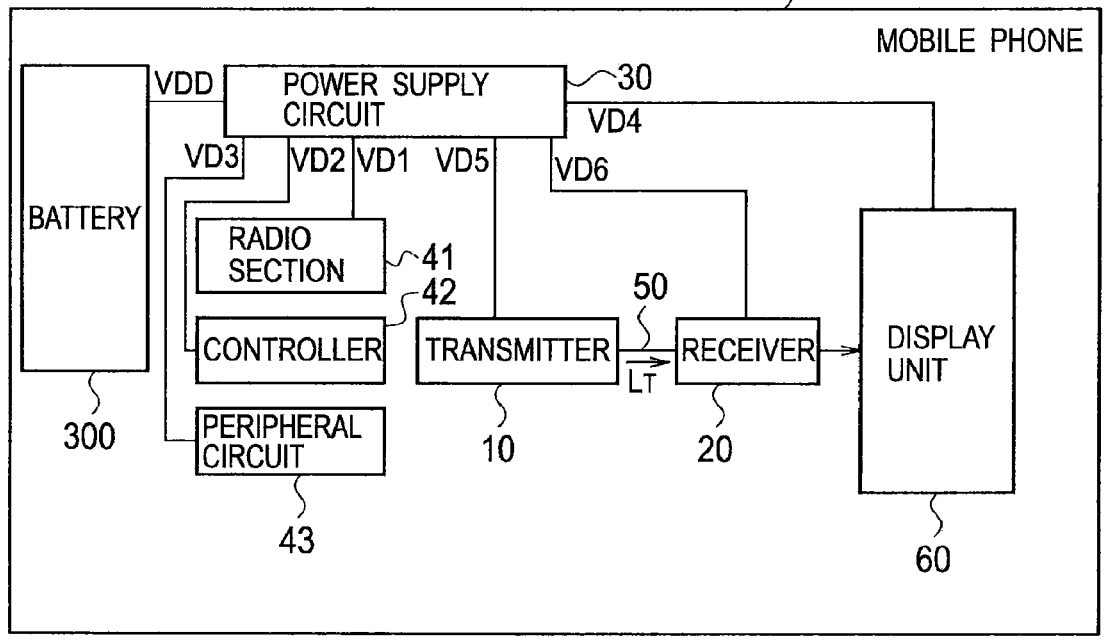
FIG. 2 is a schematic view showing an example of a mobile phone including the transmitter according to the first embodiment of the present invention.

FIG. 2 shows an example where the information processing device including the transmitter 10 shown in FIG. 1 is a mobile phone. The mobile phone 2 shown in FIG. 2 includes: a radio section 41 such as an RF circuit; a controller 42 performing information processing and the like; a peripheral circuit 43 such as a camera; a display unit 60 such as a liquid crystal display. The power supply circuit 30 generates, from a source voltage VDD supplied from a battery 300, source voltages VD1, VD2, VD3, VD4, VD5, and VD6, which are supplied to the radio section 41, controller 42, peripheral circuit 43, display unit 60, transmitter 10, and receiver 20, respectively. For example, the source voltage VD1 is 3.0 V, the source voltage VD2 is 1.5 V, and the source voltages VD3 to VD6 are 2.5 V. Image data is transmitted from the transmitter 10 through the receiver 20 to the display unit 60.

When the mobile phone 2 is a folding mobile phone, a flexible optical path 50, for example, such as a plastic fiber or a resin optical waveguide, is disposed in a hinge part of the mobile phone. This facilitates layout of the transmission lines, which is restricted at arranging signals because of narrow space within the information processing device 1.

By incorporating the voltage conversion circuit 11 in the transmitter 10, the light emitting element 121 can output the optical signal $L_T$ in an optimal operating condition even if the maximum source voltage supplied by the power supply circuit 30 is lower than the drive voltage V2 necessary for operation of the light emitting element 121. Furthermore, the transmitter 10 according to the first embodiment of the present invention can output the optical signal $L_T$ in the optimal operating condition even if the source voltages VD1 to VD6 are reduced in order to increase the operating time of the mobile phone operated with the battery 300 or reduce the size and weight of the mobile phone by reducing the capacitance of the battery 300.

Figure 3:
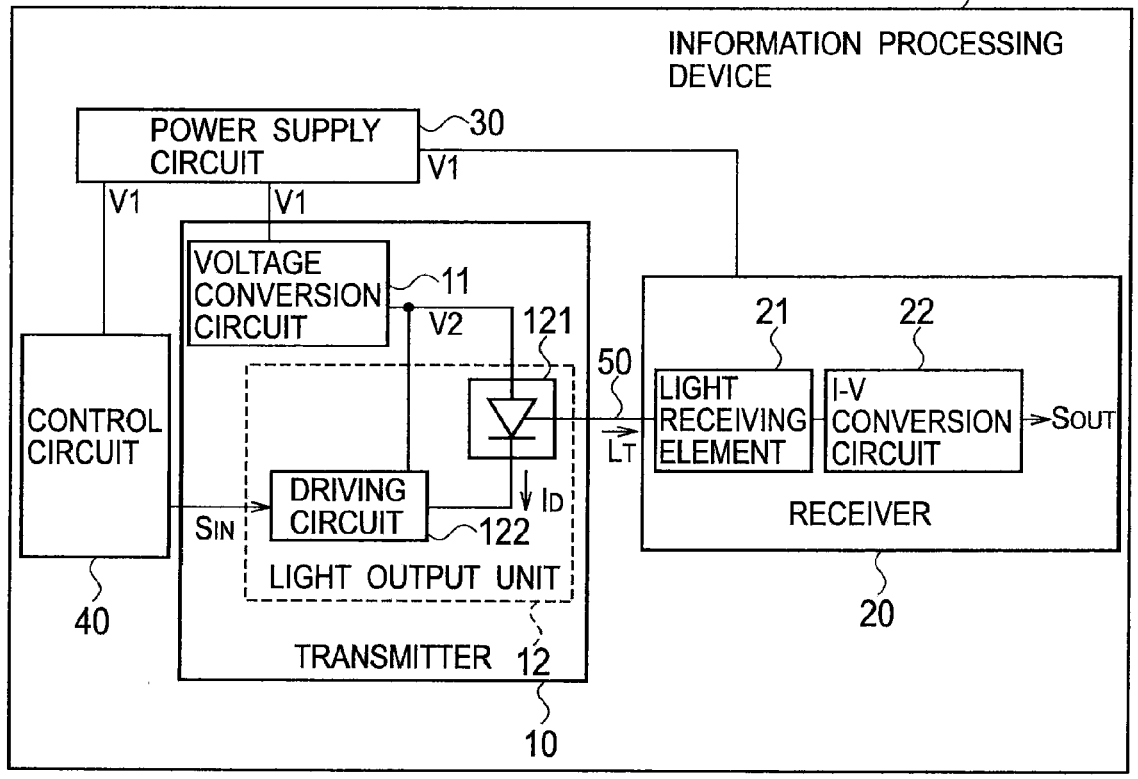
FIG. 3 is a schematic view showing another configuration of the transmitter according to the first embodiment of the present invention.

In the transmitter 10 shown in FIG. 1, the power supply voltage V1 is supplied from the power supply circuit 30 to the driving circuit 122. However, as shown in FIG. 3, the driving circuit 122 may be driven by the drive voltage V2 supplied by the voltage conversion circuit 11.

As described above, according to the transmitter 10 of the first embodiment of the present invention, by incorporating the transmitter 10 within the voltage conversion circuit 11, it is possible reduce EMI while preventing increases in mounting area and manufacturing cost of the information processing device 1 including an element (for example, the light emitting element 121) whose source voltage is hardly reduced compared to the other circuits. Moreover, the voltage conversion circuit 11 and light output unit 12 constitute a single module and mounted on the substrate. Accordingly, to form an information processing device composed of a transmitter not using the voltage conversion circuit 11, only the transmitter 10 needs to be replaced, and the other circuits and units can be shared.

The transmitter 10 according to the first embodiment of the present invention is suitable for information processing devices which need to transmit a large volume of data under less influence of EMI, such as mobile phones, copiers and printers. For example, in a mobile phone with a wide VGA display, data of 800×480 pixels are transmitted at 60 frames/sec, and data transfer at 1 Gbps is required. According to the transmitter 10 shown in FIG. 1, this data transfer can be implemented through optical transmission with less influence of EMI.

<Modification>

Figure 4:
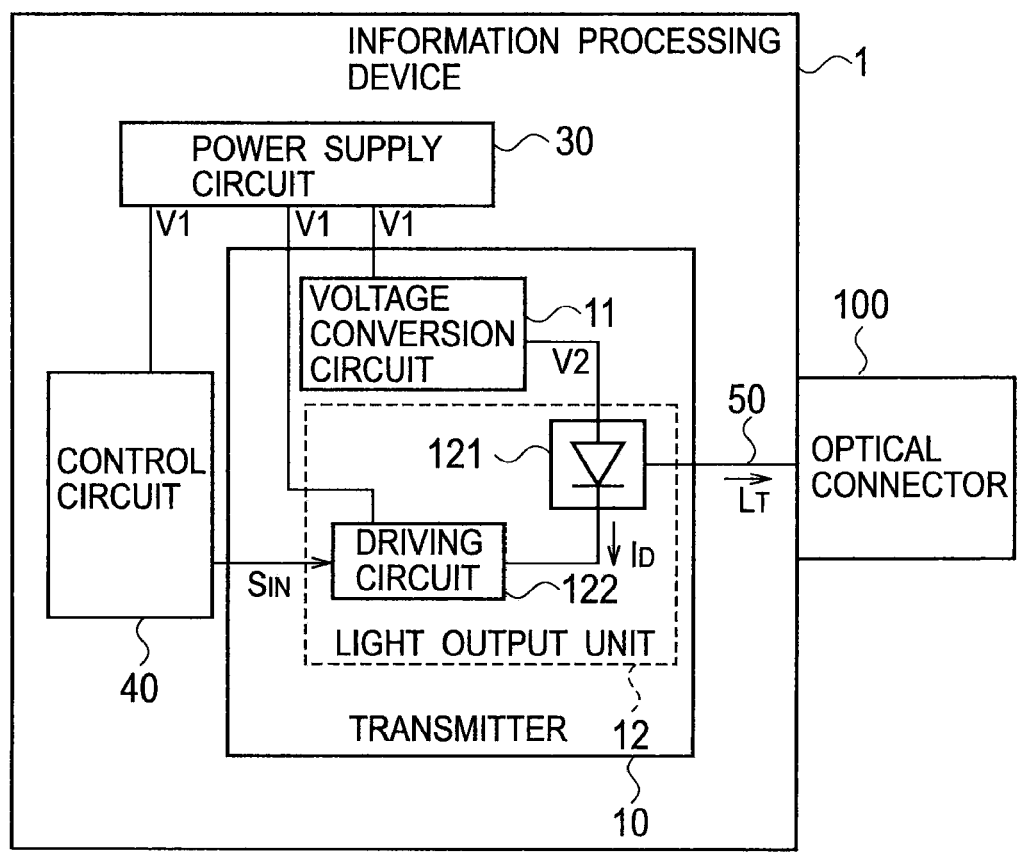
FIG. 4 is a schematic view showing a modification of the information processing device including the transmitter according to the first embodiment of the present invention.

FIG. 4 shows a modification of the information processing device 1 including the transmitter 10 according to the first embodiment of the present invention. The information processing device 1 shown in FIG. 1 incorporates the transmitter 10 and receiver 20 which are mounted on a same substrate, and the optical transmission by the transmitter 10 is performed within the same substrate.

On the other hand, FIG. 4 shows an example where the receiver 20 is not mounted on the same substrate where the transmitter 10 is mounted and an optical connector 100 is disposed on the substrate. The optical signal $L_T$ outputted from the transmitter 10 is transmitted to the optical connector 100 through the optical path 50. The optical connector 100 can be connected to another substrate directly or through an optical transmission path connected to the optical connector 100. In the example of FIG. 4, the transmitter 10 is used for optical transmission between the substrates.

According to the transmitter 10 shown in FIG. 4, it is possible to implement optical transmission between information processing devices while preventing the increases in manufacturing cost and mounting area.

Second Embodiment

Figure 5:
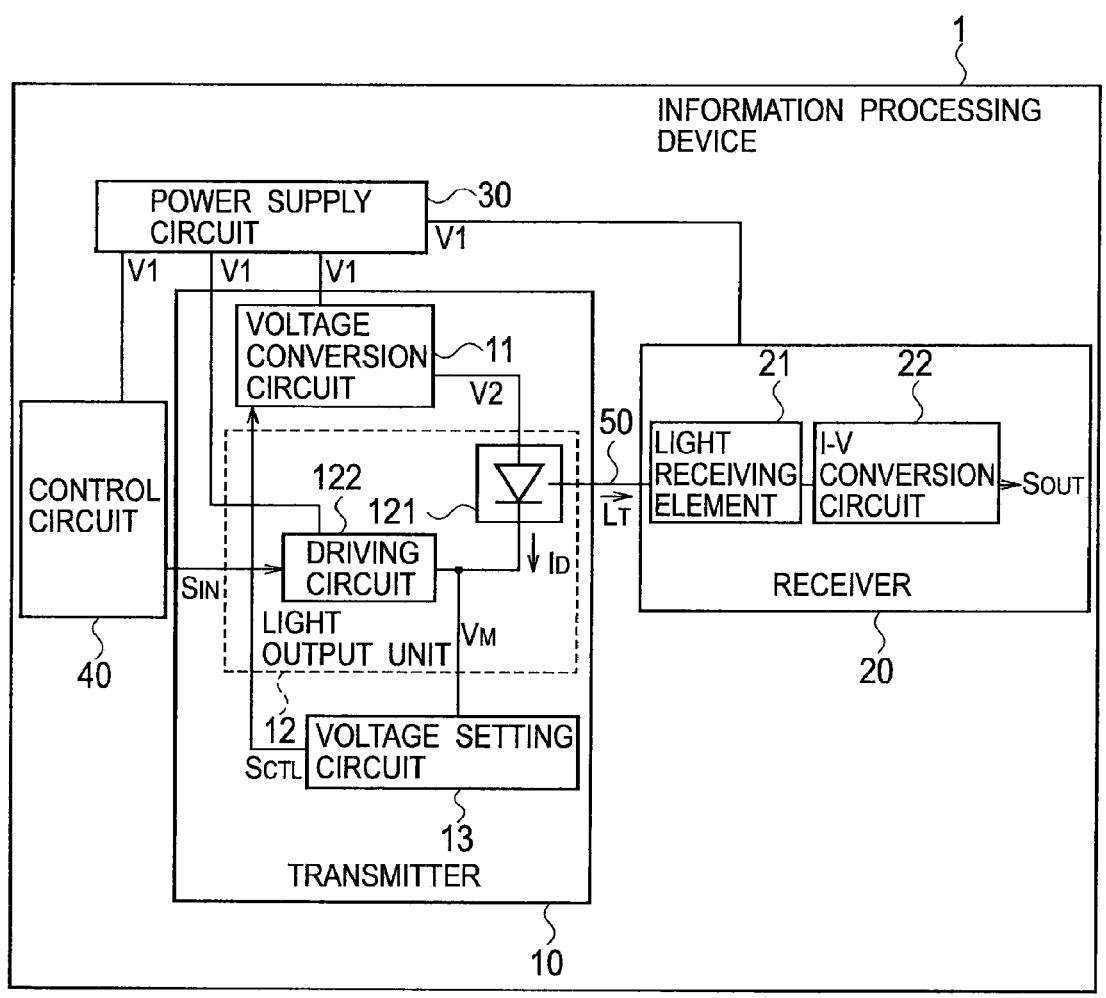
FIG. 5 is a schematic view showing a configuration of an information processing device including a transmitter according to a second embodiment of the present invention.

As shown in FIG. 5, a transmitter 10 according to a second embodiment of the present invention differs from the transmitter 10 shown in FIG. 1 in including a voltage setting circuit 13. The other configuration is the same as that of the first embodiment shown in FIG. 1. The voltage setting circuit 13 controls the voltage conversion circuit 11 according to a terminal voltage $V_M$ of the light emitting element 121 of the light output unit 12 for setting the drive voltage V2.

In the transmitter 10 shown in FIG. 5, the light emitting element 121 is a semiconductor laser. The anode electrode terminal of the semiconductor laser receives the drive voltage V2, and the cathode electrode terminal is connected to the driving circuit 122. When the terminal voltage $V_M$ is lower than the voltage necessary for operation of the driving circuit 122, the drive current $I_D$ cannot be obtained as being set. The voltage setting circuit 13 shown in FIG. 5 monitors the terminal voltage $V_M$ of the terminal on the cathode side connected to the driving circuit 122 of the light emitting element 121 and maintains the voltage necessary for operation of the driving circuit 122.

The voltage setting circuit 13 adjusts the drive voltage V2 and sets the terminal voltage $V_M$ to a predetermined value so that the drive voltage V2 is higher than the voltage necessary for operation of the driving circuit 122 even when the optical output characteristic of the light emitting element 121 changes because of a change in circumferential temperature of the like. Alternatively, even when the internal resistance of the light emitting elements 121 varies because of manufacturing variation or the like, the voltage setting circuit 13 adjusts the drive voltage V2 so that the terminal voltage $V_M$ is higher than the voltage necessary for operation of the driving circuit 122 regardless of the variations in internal resistance.

Specifically, the voltage setting circuit 13 compares a previously set reference voltage with the terminal voltage $V_M$ and outputs the differential voltage between the reference voltage and terminal voltage $V_M$ or a control signal based on the differential voltage to the voltage conversion circuit 11 for controlling the drive voltage V2. For example, when the terminal voltage $V_M$ is not the predetermined proper voltage necessary for operation of the driving circuit 122, the voltage setting circuit 13 sends a control signal $S_{CTL}$ to the voltage conversion circuit 11 for newly setting the drive voltage V2 to be outputted from the voltage conversion circuit 11 so that the terminal voltage $V_M$ becomes the predetermined proper voltage. Accordingly, the terminal voltage of the cathode electrode terminal of the light emitting element 121 can be set to the voltage necessary for operation of the driving circuit 122.

Figure 6A:
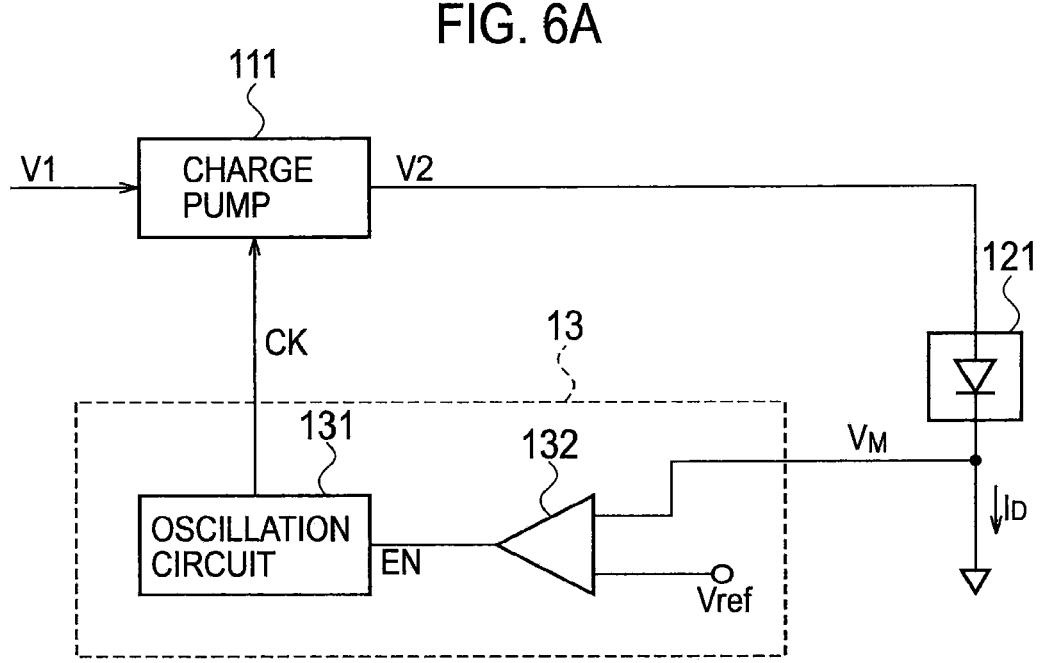
FIG. 6A is a circuit diagram showing a configuration example of the transmitter according to the second embodiment of the present invention.

FIG. 6A shows an example of the circuit which monitors the terminal voltage $V_M$ of the light emitting element 121 and controls the voltage conversion circuit 11 for setting the drive voltage V2. Herein, the voltage conversion circuit 11 includes a charge pump 111.

The voltage setting circuit 13 shown in FIG. 6A includes an oscillation circuit 131 and a comparator 132. The terminal voltage $V_M$ is inputted to one of the input terminals of the comparator 132, the reference voltage $V_{ref}$ is inputted to the other input terminal of the comparator 132. An output signal EN of the comparator 132 is inputted to the oscillator 131. The output signal EN of the comparator 132 is a low-level (L) signal when the terminal voltage $V_M$ is lower than the reference voltage $V_{ref}$ and is a high-level (H) signal when the terminal voltage $V_M$ is not lower than the reference voltage $V_{ref}$. The reference voltage $V_{ref}$ is set to the voltage corresponding to the terminal voltage $V_M$ necessary for operation of the driving circuit 122, for example.

The oscillator circuit 131 outputs a clock signal CK to the charge pump 111 of the voltage conversion circuit 11 when the output signal EN is the H signal. The clock signal CK corresponds to the control signal $S_{CTL}$ shown in FIG. 5.

Figure 6B:
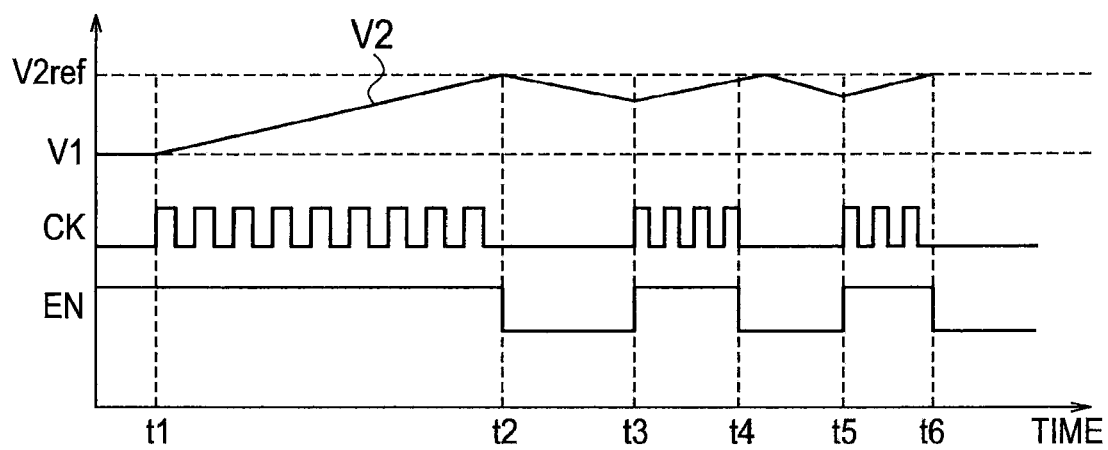
FIG. 6B is a timing diagram showing an operation example of the circuit shown in FIG. 6A.

FIG. 6B is a timing diagram showing an operation example of the circuit shown in FIG. 6A. When the charge pump 111 does not receive the clock signal CK, the charge pump 111 does not perform the voltage increasing operation. In other words, the drive voltage V2 outputted by the charge pump 111 supplied with the supply voltage V1 is equal to the value of the supply voltage V1.

At time t1, the reference voltage $V_{ref}$ is lower than the terminal voltage $V_M$, and the clock signal CK is outputted from the oscillator circuit 131 to the charge pump 111. The charge pump 111 having received the clock signal CK performs the voltage increasing operation for the supply voltage V1 and outputs the drive voltage V2. As the clock signal CK continues to be inputted to the charge pump 111, as shown in FIG. 6B, the drive voltage V2 outputted by the charge pump 111 gradually increases.

At time t2, the drive voltage V2 reaches a source voltage value (indicated by supply voltage $V2_{ref}$ in FIG. 6B) outputted when the terminal voltage $V_M$ is not lower than the reference voltage $V_{ref}$, and the output signal EN of the comparator 132 becomes the L signal. After the time t2, the oscillator 131 does not output the clock signal CK to the charge pump 111. The voltage increasing operation of the charge pump 111 then stops, and the drive voltage V2 gradually decreases from the supply voltage $V2_{ref}$. As a result, the terminal voltage $V_M$ becomes lower than the reference voltage $V_{ref}$, and the output signal EN becomes the H signal at time t3. The clock signal CK is then outputted from the oscillator 131 to the charge pump 111, and the voltage increasing operation of the charge pump 111 restarts. The drive voltage V2 then increases to the supply voltage $V2_{ref}$.

When the terminal voltage $V_M$ reaches the reference voltage $V_{ref}$ or higher at time t4, the voltage increasing operation of the charge pump 111 stops. At time t5 when the drive voltage V2 decreases and the terminal voltage $V_M$ becomes lower than the reference voltage $V_{ref}$, the voltage increasing operation restarts. After time t6, the charge pump 111 repeats the stop and restart of the voltage increasing operation. The drive voltage V2 is set so that the optical output of the light emitting element 121 becomes the predetermined value as described above.

Accordingly, the transmitter 10 including the voltage setting circuit 13 can adjust the voltage necessary for operation of the driving circuit 122 to a desired value by setting the terminal voltage $V_M$ to the predetermined value even when the optical output characteristic of the light emitting element 121 changes because of a change in circumferential temperature and the like or the optical output characteristic of the light emitting element 121 varies because of the variation in internal resistance.

Figure 7A:
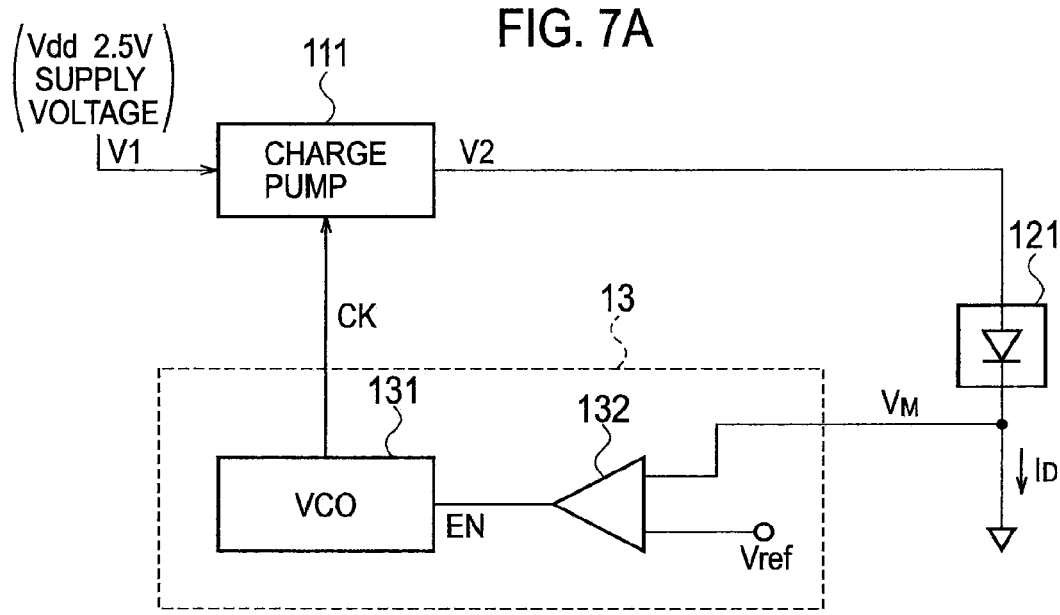
FIG. 7A is a circuit diagram showing another configuration example of the transmitter according to the second embodiment of the present invention.

FIG. 7A shows another example of the circuit which monitors the terminal voltage $V_M$ of the light emitting element 121 and controls the voltage conversion circuit 111 for setting the drive voltage V2. The oscillation circuit 131 of the voltage setting circuit 13 shown in FIG. 7A is a voltage-controlled oscillator (VCO).

Figure 7B:
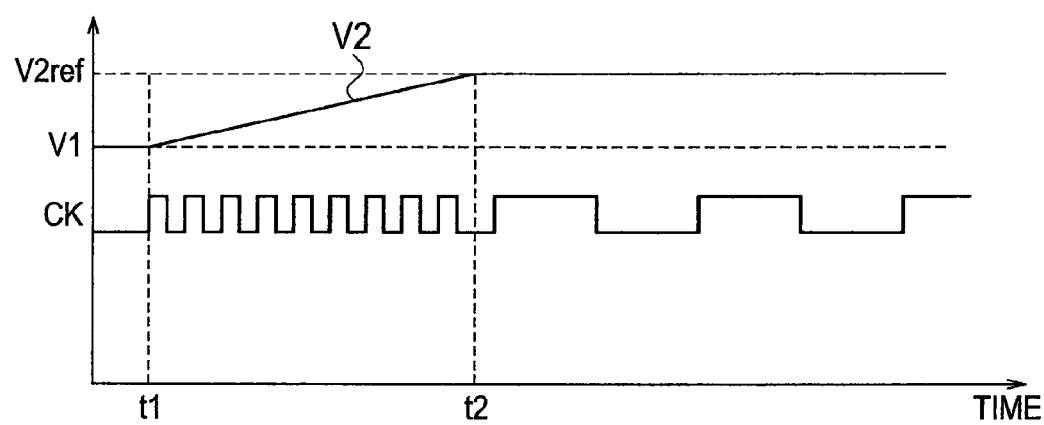
FIG. 7B is a timing diagram showing an operation example of the circuit shown in FIG. 7A.

FIG. 7B is a timing diagram showing an operation example of the circuit shown in FIG. 7A. As shown in FIG. 7B, when the reference voltage $V_{ref}$ is lower than the terminal voltage $V_M$, the clock signal CK having a short period is outputted from the VCO 131 to the charge pump 111. The charge pump 111 then performs the voltage increasing operation for the supply voltage V1 to output the drive voltage V2. As the clock signal CK having a short period continues to be inputted from time t1 to time t2, as shown in FIG. 7B, the drive voltage V2 outputted by the charge pump 111 gradually increases.

When the drive voltage V2 reaches the source voltage $V2_{ref}$, and the terminal voltage $V_M$ becomes equal to or higher than the reference voltage $V_{ref}$ at the time t2, the clock signal CK having a period longer than the period between the time t1 and t2 is outputted from the VCO 131 to the charge pump 111. The drive voltage V2 outputted from the charge pump 111 is therefore stabilized at the supply voltage $V2_{ref}$.

As previously described, a semiconductor laser can be used as the light emitting element 121 of the transmitter 10. The optical output characteristic of the semiconductor laser is highly dependent on temperature. Moreover, the output of the semiconductor laser changes because of deterioration due to aging. Accordingly, conventional information processing devices and systems including semiconductor lasers as the light emitting elements of the transmitters employ some measures including compensating the optical output characteristic by monitoring the received light level of the receiver and controlling drive current of the semiconductor laser based on the monitored value. However, the system of compensating the optical output characteristic based on the monitored received light level is for the purpose of stabilizing the optical output characteristic against the change in temperature or deterioration due to aging and cannot compensate variations in optical output characteristic due to variation in internal resistance of the semiconductor laser or the like. For example, in a semiconductor laser with large internal resistance, if the drive current is increased, the forward voltage between the terminals increases. Moreover, the voltage between the terminals is dependent on temperature. Accordingly, it is necessary to set the source voltage of the semiconductor laser considering such variation factors.

On the other hand, for applying optical transmission to portable information processing devices and the like, low power consumption is required. The design with a margin set for the source voltage considering the characteristic variation of light emitting elements is disadvantageous for low power consumption.

Moreover, information processing devices performing data transmission at high speed are often designed using so-called system-on-a-chip (SoC), which uses a miniaturized semiconductor process, and are increasingly operated with low voltage. Accordingly, to supply high source voltage only to a transmitter including a light emitting element, it is necessary to provide an extra power supply circuit for the light emitting element within the information processing device, thus increasing the cost and man-hours for development.

Moreover, it is possible to rate light emitting elements by the optical output characteristic and select a light emitting element having a desired optical output characteristic for use in the information processing device. However, this method also increases the cost and man-hours for development of the information processing device.

Furthermore, as for portable information processing devices operating with built-in batteries, the circuits mounted on the same are required to have low power consumption. Accordingly, while individual circuits need to operate at lower power, in terms of the operation margin for voltage drop of battery output, each circuit needs to operate at lower voltage. As another method, it is possible to select light emitting elements operating at low voltage for use, but selection will increase the cost and make it difficult to ensure stable supply.

On the other hand, in the transmitter 10 shown in FIG. 5, the voltage setting circuit 13 controls the voltage conversion circuit 11 according to the terminal voltage $V_M$ of the light emitting element 121 for setting the drive voltage V2. Accordingly, it is unnecessary to make a design with a margin for the source voltage considering characteristic variation in the light emitting element 121 due to the variation in internal resistance. Furthermore, it is unnecessary to rate the light emitting element 121 according to the optical output characteristic. For example, when the light emitting element 121 has high internal resistance, the voltage drop (V2−$V_M$) at the light emitting element 121 when the drive current $I_D$ flows therethrough is large. However, according to the transmitter 10 shown in FIG. 5, the drive voltage V2 is set according to the terminal voltage $V_M$, and it is unnecessary to rate the light emitting element 121.

As described above, with the transmitter 10 according to the second embodiment of the present invention, by incorporating the voltage conversion circuit 11 and voltage setting circuit 13 in the transmitter 10, it is possible to reduce EMI while preventing the increases in manufacturing cost and mounting area of the information processing device 1 including an element (for example, the light emitting element 121) whose source voltage is hardly reduced compared to the other circuits.

Moreover, the voltage conversion circuit 11, light output unit 12, and voltage setting circuit 13 constitute a single module and can be mounted on a substrate. Accordingly, to constitute the information processing device using a transmitter not including the voltage conversion circuit 11, only the transmitter 10 needs to be replaced. The other circuits and units can be shared. Moreover, it is unnecessary to dispose a special power supply circuit for the light emitting element 121 within the information processing device 1, thus preventing the increases in manufacturing cost and man-hours for development.

Furthermore, in the transmitter 10 shown in FIG. 5, the voltage setting circuit 13 monitors the terminal voltage $V_M$ on the cathode side of the light emitting element 121 and controls the voltage conversion circuit 11 according to the terminal voltage $V_M$ for setting the drive voltage V2. Accordingly, it is unnecessary to make a design with a margin set for the source voltage considering the characteristic variation of the light emitting element 121 and to rate the light emitting element 121 based on the optical output characteristic. It is therefore possible to realize low power consumption and prevent the increase in manufacturing cost of the information processing device.

Figure 8:
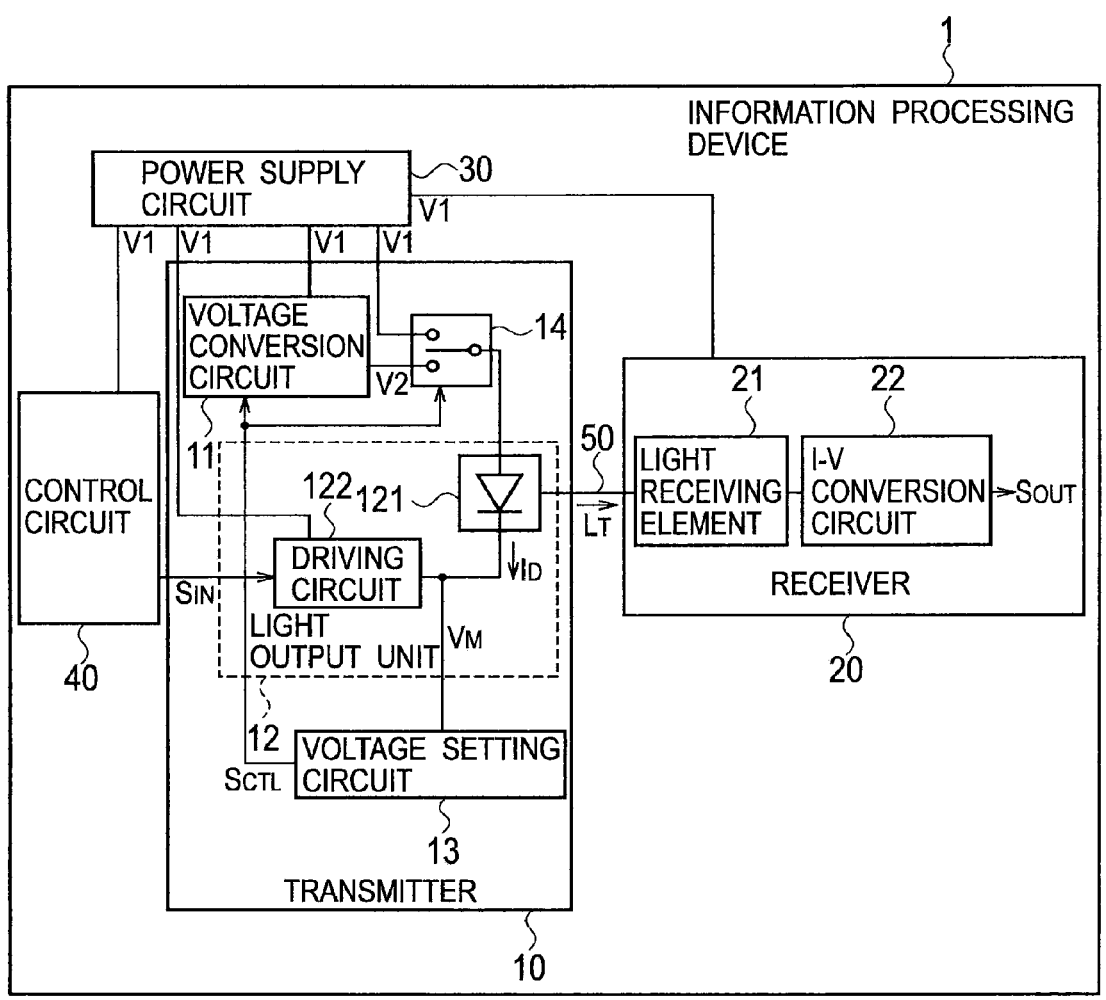
FIG. 8 is a schematic view showing another configuration of the transmitter according to the second embodiment of the present invention.

FIG. 8 shows an example of the transmitter 10 switching on and off of the voltage increasing operation of the voltage conversion circuit 11. The transmitter 10 shown in FIG. 8 includes a switch 14 setting the source voltage to be supplied to the light emitting element 121 to any one of the supply voltage V1 externally supplied and the drive voltage V2 outputted from the voltage conversion circuit 11.

For example, when the light emitting element 121 operates with the supply voltage V1, the voltage increasing operation of the voltage conversion circuit 11 is unnecessary. When the terminal voltage $V_M$ is not lower than the reference voltage $V_{ref}$ without the voltage increasing operation of the voltage conversion circuit 11, the voltage setting circuit 13 sets the switch 14 so that the supply voltage V1 is supplied to the light emitting element 121 as the drive voltage V2. If the voltage conversion circuit 11 is controlled and set by the voltage setting circuit 13 so as not to operate at this time, the power consumption of the information processing device 1 can be reduced.

Figure 9:
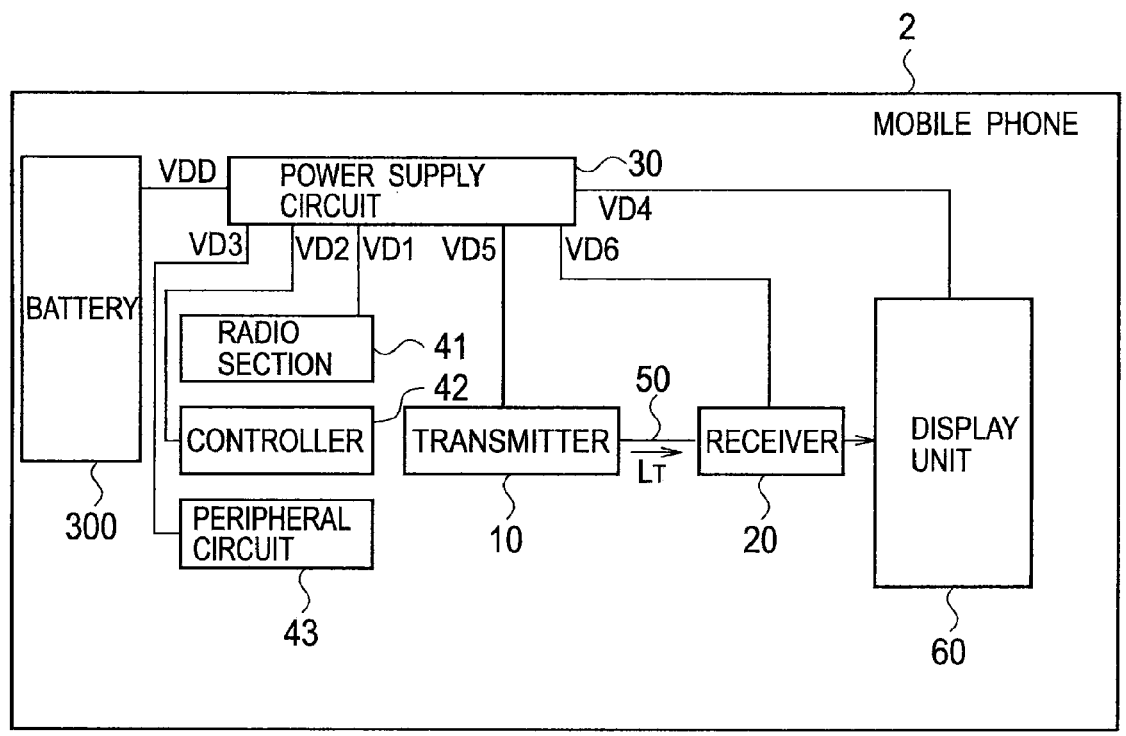
FIG. 9 is a schematic view showing an example of a mobile phone including the transmitter according to the second embodiment of the present invention.

FIG. 9 shows an example where the information processing device including the transmitter 10 shown in FIG. 5 is a mobile phone. Similar to the mobile phone 2 shown in FIG. 2, the mobile phone 2 shown in FIG. 9 includes: the radio section 41 such as an RF circuit; the controller 42 performing information processing and the like; the peripheral circuit 43 such as a camera; and the display unit 60 such as a liquid crystal display. Image data is transmitted from the transmitter 10 through the receiver 20 to the display unit 60.

Figure 10:
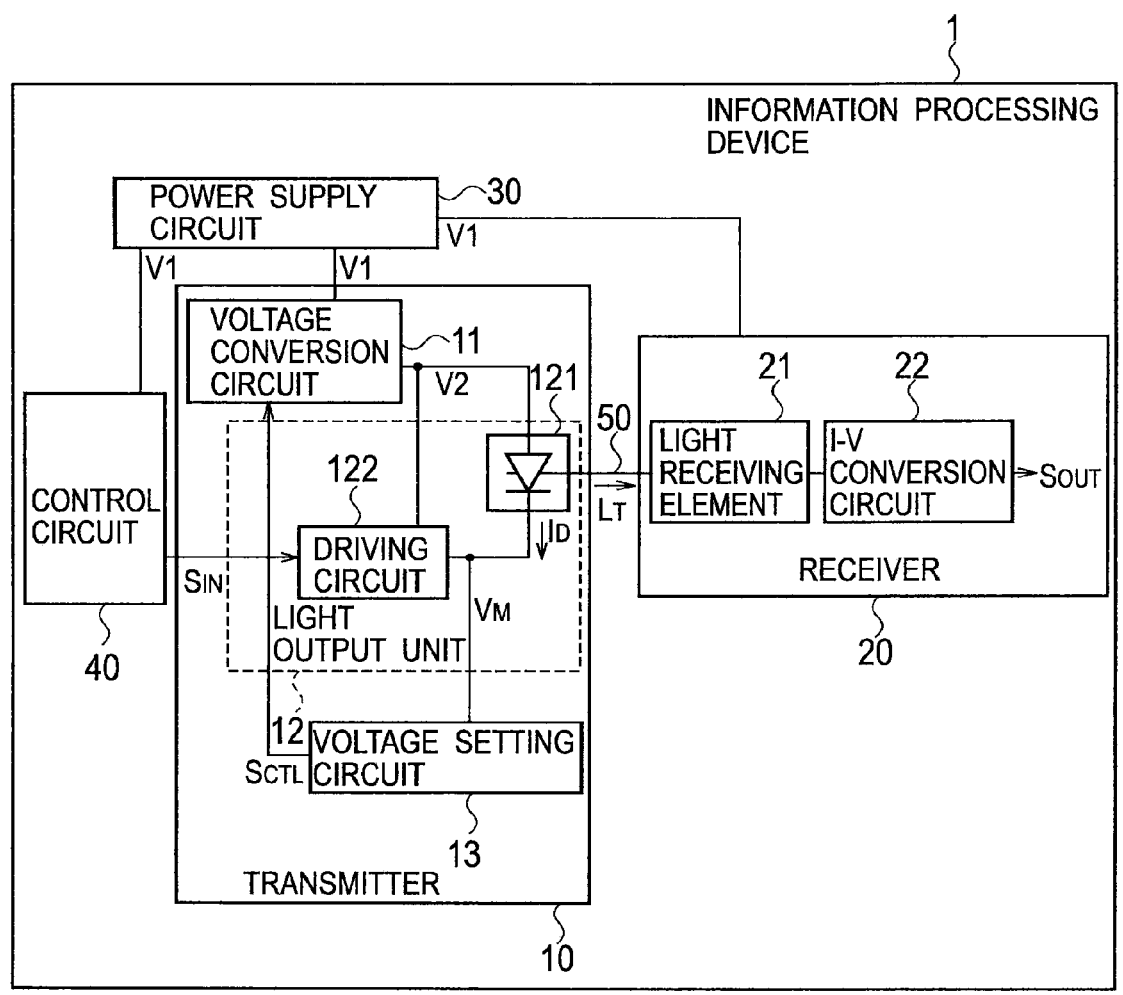
FIG. 10 is a schematic view showing another configuration of the transmitter according to the second embodiment of the present invention.

In the transmitter 10 shown in FIG. 5, the supply voltage V1 is supplied from the power supply circuit 30 to the driving circuit 122. However, as shown in FIG. 10, the driving circuit 122 may be driven by the drive voltage V2 supplied from the voltage conversion circuit 11.

Figure 11:
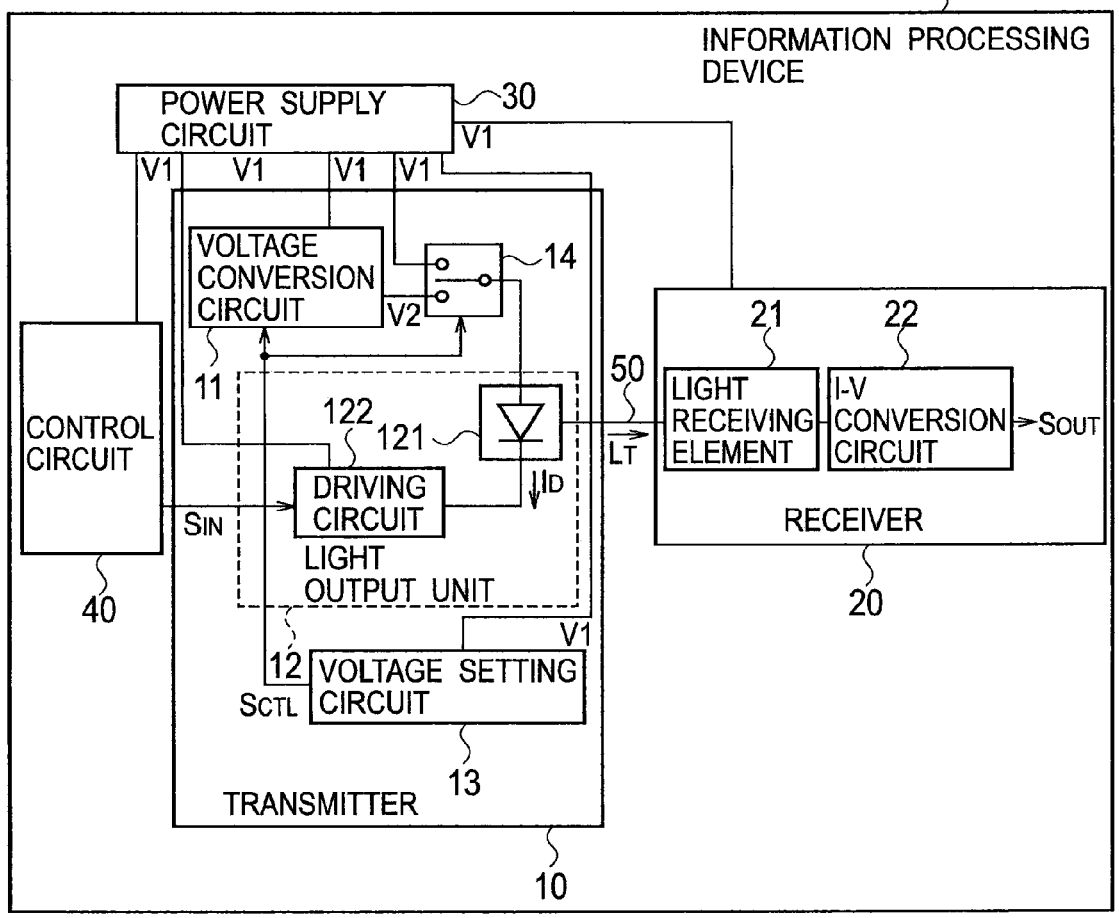
FIG. 11 is a schematic view showing still another configuration of the transmitter according to the second embodiment of the present invention.
Figure 12:
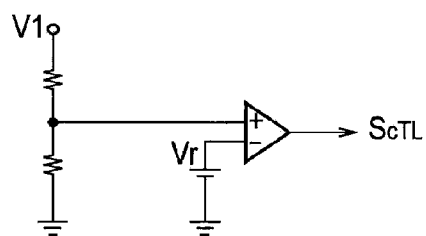
FIG. 12 is a schematic view showing a configuration example of a voltage setting circuit of the transmitter shown in FIG. 11.

Moreover, the terminal voltage $V_M$ changes with a change in the supply voltage V1. Accordingly, as shown in FIG. 11, the voltage setting circuit 13 may monitor the supply voltage V1 instead of the terminal voltage $V_M$ to maintain the voltage necessary for operation of the driving circuit 122. In other words, the voltage setting circuit 13 functions as a source voltage detection circuit monitoring the supply voltage V1 and controls the drive voltage V2 according to a change in the supply voltage V1. Furthermore, the voltage setting circuit 13 controls the operation of the switch 14 and also controls the drive voltage V2. Accordingly, the transmitter 10 shown in FIG. 11 can output the optical signal $L_T$ in an optimal operating condition even when the supply voltage V1 supplied from the power supply circuit 30 changes. FIG. 12 shows a configuration example of the voltage setting circuit 13 monitoring the supply voltage V1. The voltage setting circuit 13 shown in FIG. 12 compares the value obtained by resistive division of the supply voltage V1 with the reference voltage $V_r$ and outputs the control signal $S_{CTL}$. The reference voltage $V_r$ shown in FIG. 12 is set corresponding to the supply voltage V1 necessary for operation of the driving circuit 122, for example.

As described above, by incorporating the voltage conversion circuit 11 and voltage setting circuit 13 in the transmitter 10, even when the maximum source voltage supplied from the power supply circuit 30 is lower than the drive voltage V2 necessary for operation of the driving circuit 122, the terminal voltage $V_M$ can be maintained at the voltage necessary for operation of the driving circuit 122, and the light emitting element 121 can output the optical signal $L_T$ in an optimal operating condition. Furthermore, even if source voltages for circuits other than the light emitting element 121 are reduced in order to increase the operating time with a battery or reduce the size and weight of the mobile phone by reducing the capacity of the battery, the transmitter 10 according to the second embodiment of the present invention can output the optical signal $L_T$ in the optimal operating condition. The others are substantially the same as those of the first embodiment, and the redundant description is omitted.

<Modification>

Figure 13:
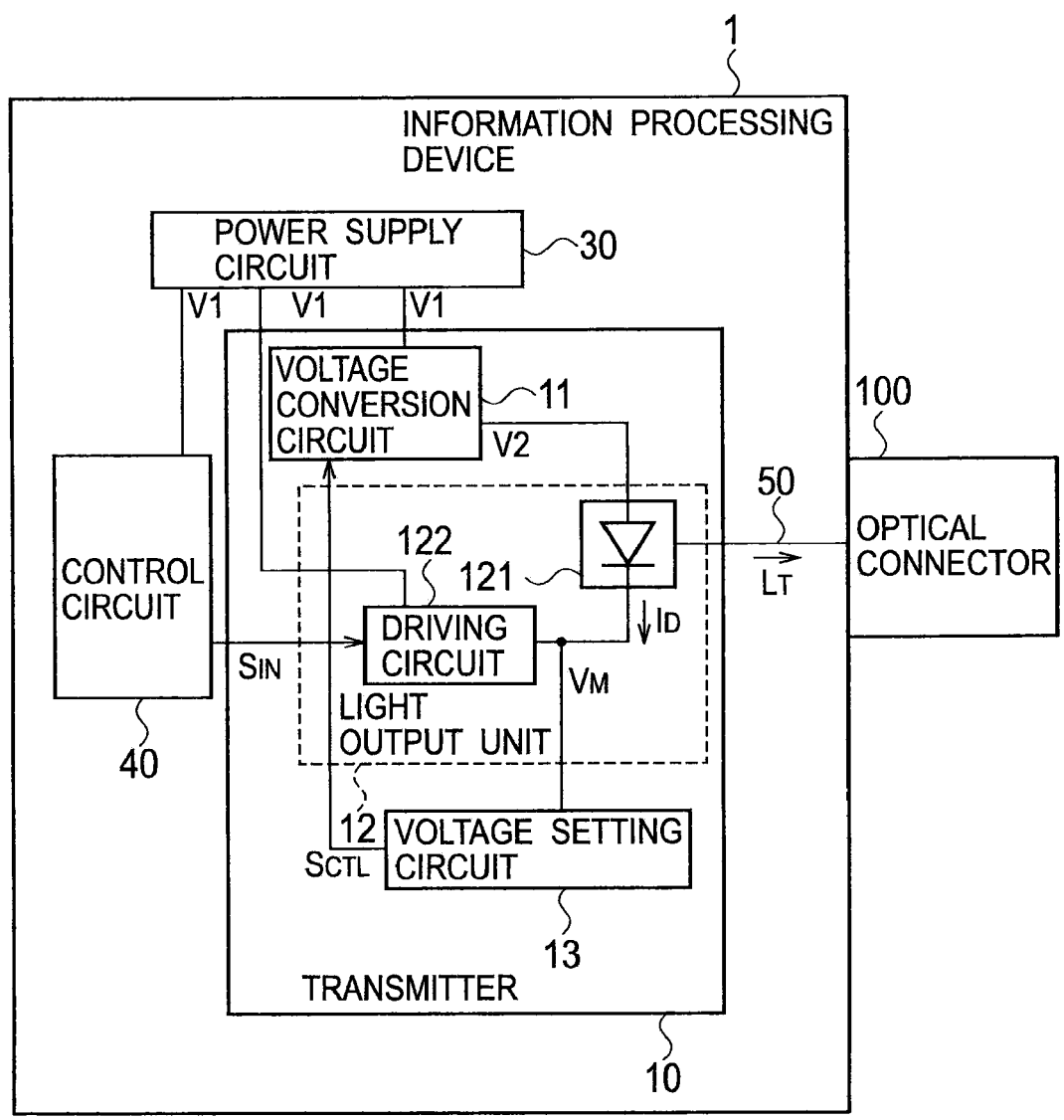
FIG. 13 is a schematic view showing a modification of the information processing device including the transmitter according to the second embodiment of the present invention.

FIG. 13 shows a modification of the information processing device 1 including the transmitter 10 according to the second embodiment of the present invention. The information processing device 1 shown in FIG. 5 incorporates the transmitter 10 and receiver 20 mounted on a same substrate, and the optical transmission by the transmitter 10 is performed within the same substrate. On the other hand, FIG. 13 shows an example where the receiver 20 is not mounted on the same substrate where the transmitter 10 is mounted and an optical connector 100 is arranged on the substrate.

The optical signal $L_T$ outputted from the transmitter 10 shown in FIG. 13 is transmitted through the optical path 50 to the optical connector 100. The optical connector 100 can be connected to another substrate directly or through an optical transmission path connected to the optical connector 100. In the example of FIG. 13, the transmitter 10 is used for optical transmission between the substrates.

According to the transmitter 10 shown in FIG. 13, it is possible to implement optical transmission between information processing devices while preventing the increases in manufacturing cost and man-hours for development.

Third Embodiment

A transmitter 10 according to a third embodiment of the present invention differs from the transmitter 10 shown in FIG. 5 in further including a current setting circuit 15 receiving a feedback signal $S_{FD}$ from the outside of the transmitter 10 and setting drive current $I_D$ of the light emitting element 121. The other configuration is the same as that of the second embodiment shown in FIG. 5.

The optical signal $L_T$ outputted from the transmitter 10 is transmitted to the receiver 20 through the optical path 50. The optical path 50 is composed of an optical fiber, an optical waveguide, or the like. The current setting circuit 15 shown in FIG. 14 receives the feedback signal $S_{FD}$ from the receiver 20 having received the optical signal $L_T$ outputted from the transmitter 10 and sending the control signal $S_{SET}$ to the driving circuit 122 according to the feedback signal $S_{FD}$ to cause the driving circuit 122 to set the drive current $I_D$ of the light emitting element 121.

The receiver 20 converts the received optical signal $L_T$ to an output signal $S_{OUT}$ as an electrical signal for output. The receiver 20 shown in FIG. 14 includes: the light receiving element 21 receiving the optical signal $L_T$; the I-V conversion circuit 22 converting conducting current outputted by the light receiving element 21 into voltage and outputs the output signal $S_{OUT}$; and the monitor circuit 23 supplying the feedback signal $S_{FD}$ to the current setting circuit 15 according to the conducting current of the light receiving element 21.

The monitor circuit 23 receives a monitor signal $S_{MON}$ of the optical signal $L_T$ from the I-V conversion circuit 22 and sends the feedback signal $S_{FD}$ to the current setting circuit 15 according to the monitor signal $S_{MON}$. In other words, the monitor circuit 23 monitors the conducting current of the light receiving element 21 and sends the feedback signal $S_{FD}$ according to the conducting current to the current setting circuit 15. The driving circuit 122 thus controls the drive current $I_D$ of the light emitting element 121. When the conducting current decreases because the optical signal $L_T$ received by the light receiving element 21 is weak, for example, the monitor circuit 23 having detected the decrease in conducting current sends the feedback signal $S_{FD}$ to the current setting circuit 15 so as to increase the drive current $I_D$.

Specifically, the current setting circuit 15 senses a change in optical output characteristic of the light emitting element 121 due to a change in circumferential temperature and the like as a change in the feedback signal $S_{FD}$ received from the receiver 20. The current setting circuit 15 controls the driving circuit 122 based on the feedback signal $S_{FD}$ and adjusts and sets the drive current $I_D$ to a predetermined value. The current setting circuit 15 thus controls the optical output of the light emitting element 121 to a desired value. Alternatively, even if the optical output characteristic varies because of the variation in internal resistance of the light emitting element 121 due to the manufacturing variation or the like, the current setting circuit 15 can set the optical output of the light emitting element 121 to the desired value regardless of the variation in internal resistance by adjusting and setting the drive current $I_D$ to the predetermined value. Accordingly, the magnitude of the optical signal $L_T$ outputted by the light emitting element 121 can be set to a desired value.

Furthermore, the current setting circuit 15 senses, as a change in the feedback signal $S_{FD}$, a change in transmission efficiency of the optical transmission path 50 itself and a change in received light level of the receiver 20 in addition to the change in optical output characteristic of the light emitting element 121 due to the change in circumferential temperature, deterioration of the light emitting element 121, and the like. The current setting circuit 15 controls the driving circuit 122 and adjusts the drive current $I_D$ to the predetermined value, thus controlling the optical output of the light emitting element 121 to the desired value.

As described above, in the transmitter 10 shown in FIG. 14, the voltage setting circuit 13 controls the voltage conversion circuit 11 according to the terminal voltage $V_M$ of the light emitting element 121 for setting the drive voltage V2, and the current setting circuit 15 having received the feedback signal $S_{FD}$ from the outside controls the driving circuit 122 for controlling the drive current $I_D$ of the light emitting element 121. Accordingly, it is unnecessary to make a design with a margin set for the source voltage considering the characteristic variation of the light emitting element 121 due to the variation in internal resistance. Furthermore, it is unnecessary to rate the light emitting element 121 according to the optical output characteristic.

As described above, according to the transmitter 10 of the third embodiment of the present invention, the voltage conversion circuit 11, voltage setting circuit 13, and current setting circuit 15 are incorporated in the transmitter 10. It is therefore possible to reduce EMI while preventing the increases in mounting area and manufacturing cost of the information processing device 1 including an element (for example, the light emitting element 121) whose source voltage is hardly reduced compared to the other circuits.

Moreover, the voltage conversion circuit 11, light output unit 12, voltage setting circuit 13, and current setting circuit 15 constitute a single module to be mounted on a substrate. For constituting an information processing device using a transmitter not including the voltage conversion circuit 11, therefore, only the transmitter 10 should be changed. The other circuits and units can be shared. Moreover, it is unnecessary to arrange a special power supply circuit for the light emitting element 121 within the information processing device 1, thus preventing the increases in manufacturing cost and man-hours for development.

According to the third embodiment of the present invention, it is possible to provide the transmitter 10 and information processing device 1 capable of adjusting the drive current $I_D$ and adjusting the source voltage of the light emitting element 121 to necessary voltage against the changes in optical output and received light level of the receiver 20 due to external factors in addition to the internal factors including the temperature dependence, deterioration due to aging, and variation in internal resistance.

Figure 14:
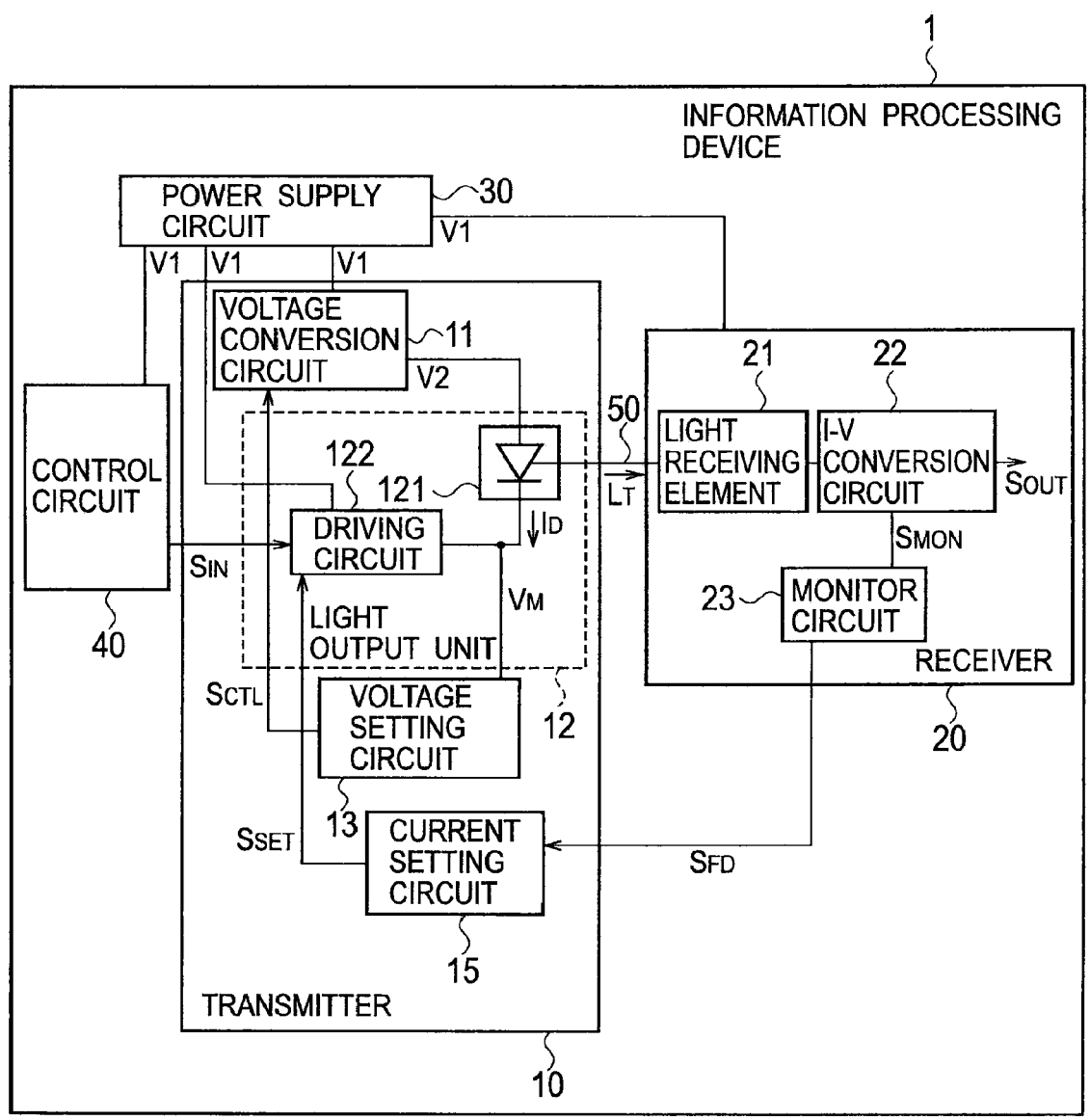
FIG. 14 is a schematic view showing a configuration of an information processing device including a transmitter according to a third embodiment of the present invention.
Figure 15:
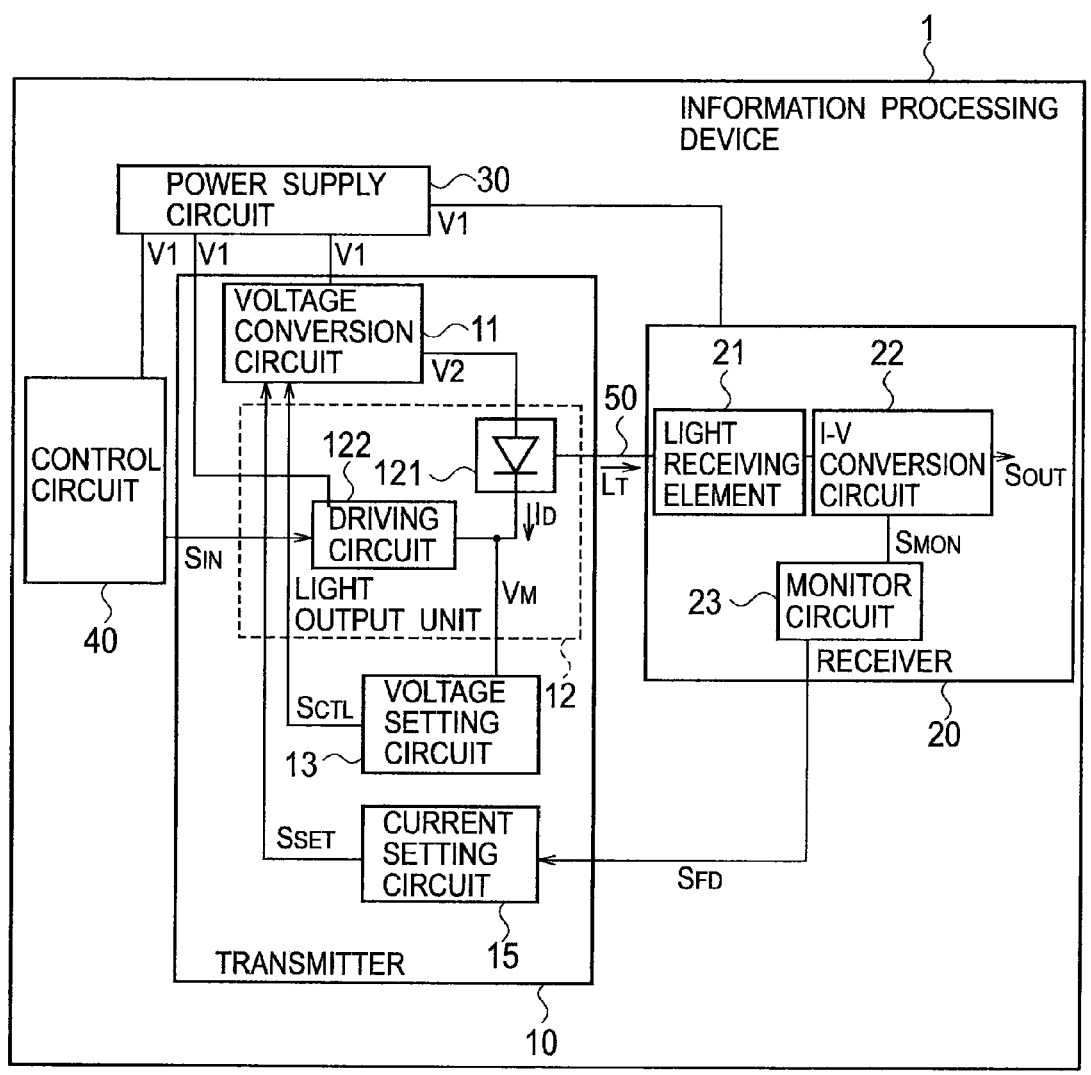
FIG. 15 is a schematic view showing another configuration of the transmitter according to the third embodiment of the present invention.

FIG. 15 shows an example where the control signal $S_{SET}$ outputted from the current setting circuit 15 is sent to the voltage conversion circuit 11 instead of the driving circuit 121. The current setting circuit 15 can set the drive current $I_D$ of the light emitting element 121 by supplying the control signal $S_{SET}$ to the voltage conversion circuit 11 for direct control of the voltage conversion circuit 11. The other configuration is the same as that of the information processing device 1 shown in FIG. 14.

Figure 16:
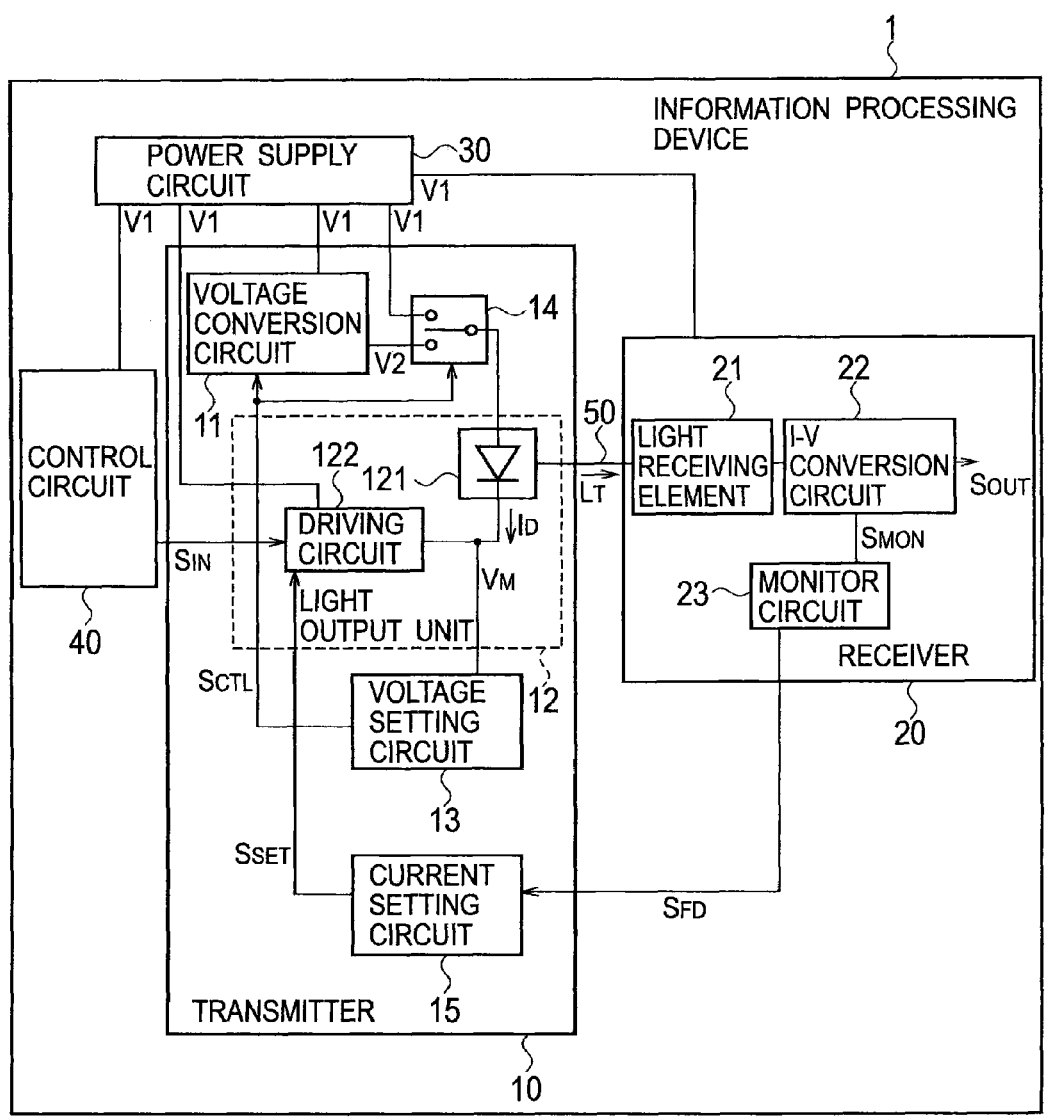
FIG. 16 is a schematic view showing still another configuration of the transmitter according to the third embodiment of the present invention.

FIG. 16 shows an example of the transmitter 10 switching on and off of the voltage increasing operation of the voltage conversion circuit. The transmitter 10 shown in FIG. 16 includes a switch 14 setting the source voltage supplied to the light emitting element 121 to any one of the supply voltage V1 externally supplied and the drive voltage V2 outputted from the voltage conversion circuit 11.

For example, when the light emitting element 121 operates with the supply voltage V1, the voltage increasing operation of the voltage conversion circuit 11 is unnecessary. Accordingly, when the terminal voltage $T_M$ is equal to or higher than the reference voltage $V_{ref}$ without the voltage increasing operation of the supply voltage V1, the voltage setting circuit 13 sets the switch 14 so that the supply voltage V1 is supplied to the light emitting element 121 as the drive voltage V2. If the voltage conversion circuit 11 is set by the control of the voltage setting circuit 13 so as not to operate at this time, the power consumption of the information processing device 1 can be reduced. The other configuration is the same as that of the information processing device 1 shown in FIG. 14.

Figure 17:
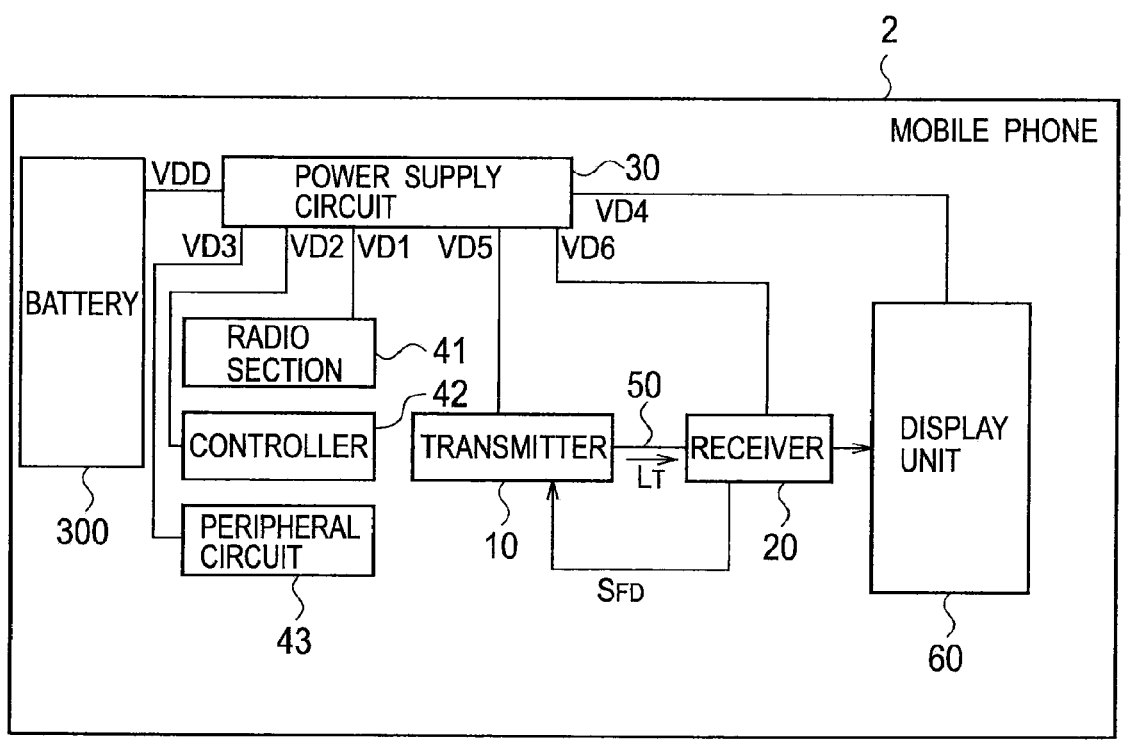
FIG. 17 is a schematic view showing an example of a mobile phone including the transmitter according to the third embodiment of the present invention.

FIG. 17 shows an example where the information processing device 1 including the transmitter 10 shown in FIG. 14 is a mobile phone. Similar to the mobile phones 2 shown in FIGS. 2 and 9, the mobile phone 2 shown in FIG. 17 includes: a radio section 41 such as an RF circuit; a controller 42 performing information processing and the like; a peripheral circuit 43 such as a camera; and a display unit 60 such as a liquid crystal display. Image data is transmitted from the transmitter 10 through the receiver 20 to the display unit 60. Furthermore, the feedback signal $S_{FD}$ is sent from the receiver 20 to the transmitter 10, and the current setting circuit 15 of the transmitter 10 senses a change in the feedback signal $S_{FD}$ to detect a change in transmission efficiency of the optical transmission path 50 itself and a change in the received light level of the receiver 20 in addition to a change in the optical output characteristic of the light emitting element 121 due to the change in circumferential temperature, deterioration of the element, and the like, for example. The current setting circuit 15 controls the driving circuit 122 for adjusting the drive current $I_D$ to the predetermined value, thus controlling the optical output of the light emitting element 121 to the desired value. Alternatively, even if the optical output characteristic varies because of the variation in internal resistance of the light emitting element 121 due to the manufacturing variation or the like, the optical output of the light emitting element 121 is adjusted and set to the desired value regardless of the variation in internal resistance by adjusting and setting the drive current $I_D$ to the predetermined value. The magnitude of the optical signal $L_T$ outputted by the light emitting element 121 can be therefore set to a desired value.

Even when the supply voltage is reduced in order to increase the operating time with the battery 300 or to reduce the mobile phone in size and weight by reducing the capacity of the battery 300, the transmitter 10 according to the third embodiment of the present invention can output the optical signal $L_T$ in an optimal operating condition. According to the third embodiment of the present invention, it is possible to provide a mobile phone capable of adjusting the drive current and adjusting the source voltage of the light emitting element to necessary voltage against the changes in optical output and received light level of the receiver due to the external factors in addition to the internal factors including the temperature dependence, deterioration due to aging, and variation in internal resistance.

Figure 18:
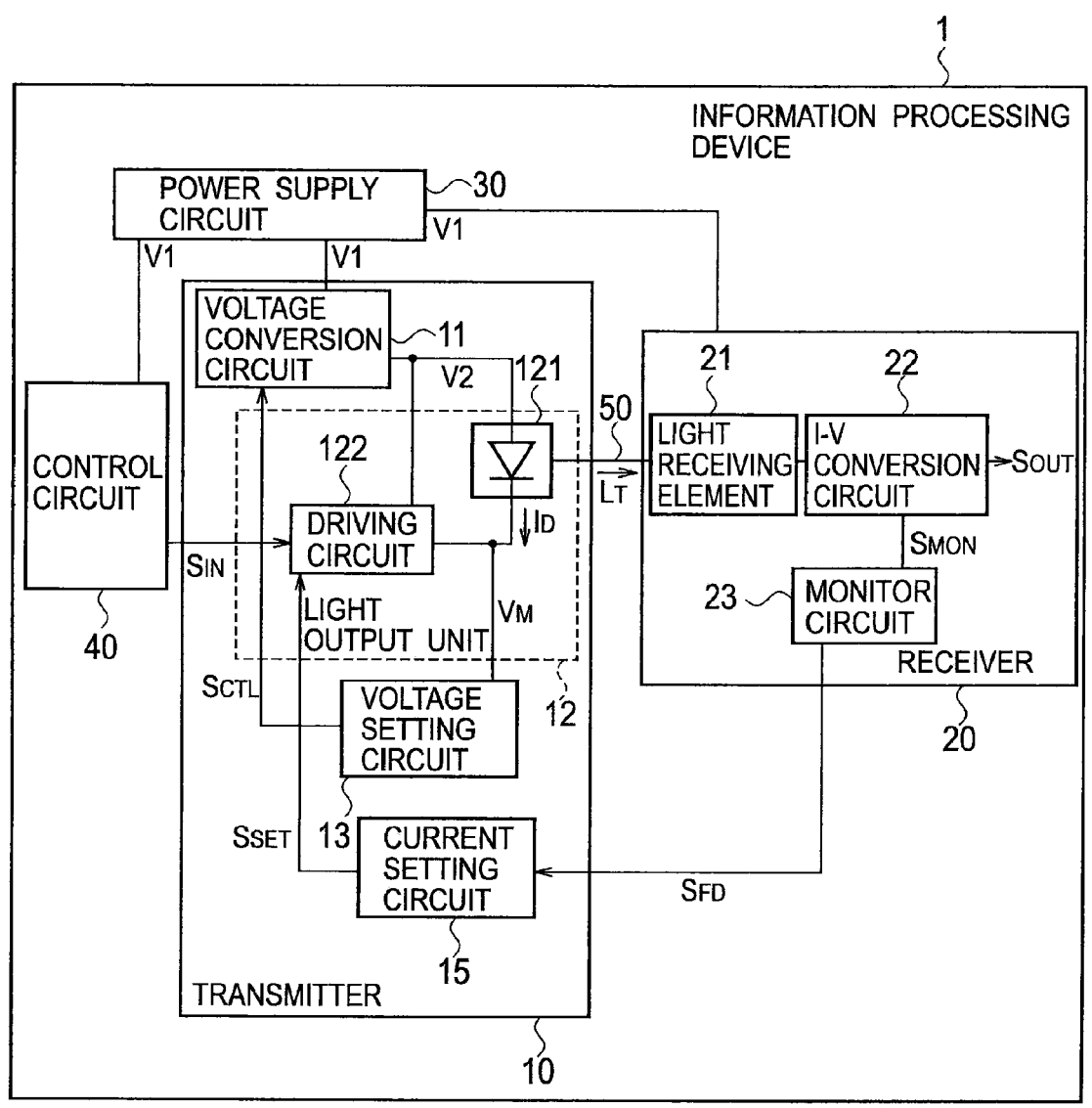
FIG. 18 is a schematic view showing another configuration of the transmitter according to the third embodiment of the present invention.

In the transmitter 10 shown in FIG. 14, the supply voltage V1 is supplied from the power supply circuit 30 to the driving circuit 122. However, as shown in FIG. 18, the driving circuit 122 may be driven by the drive voltage V2 supplied by the voltage conversion circuit 11.

Figure 19:
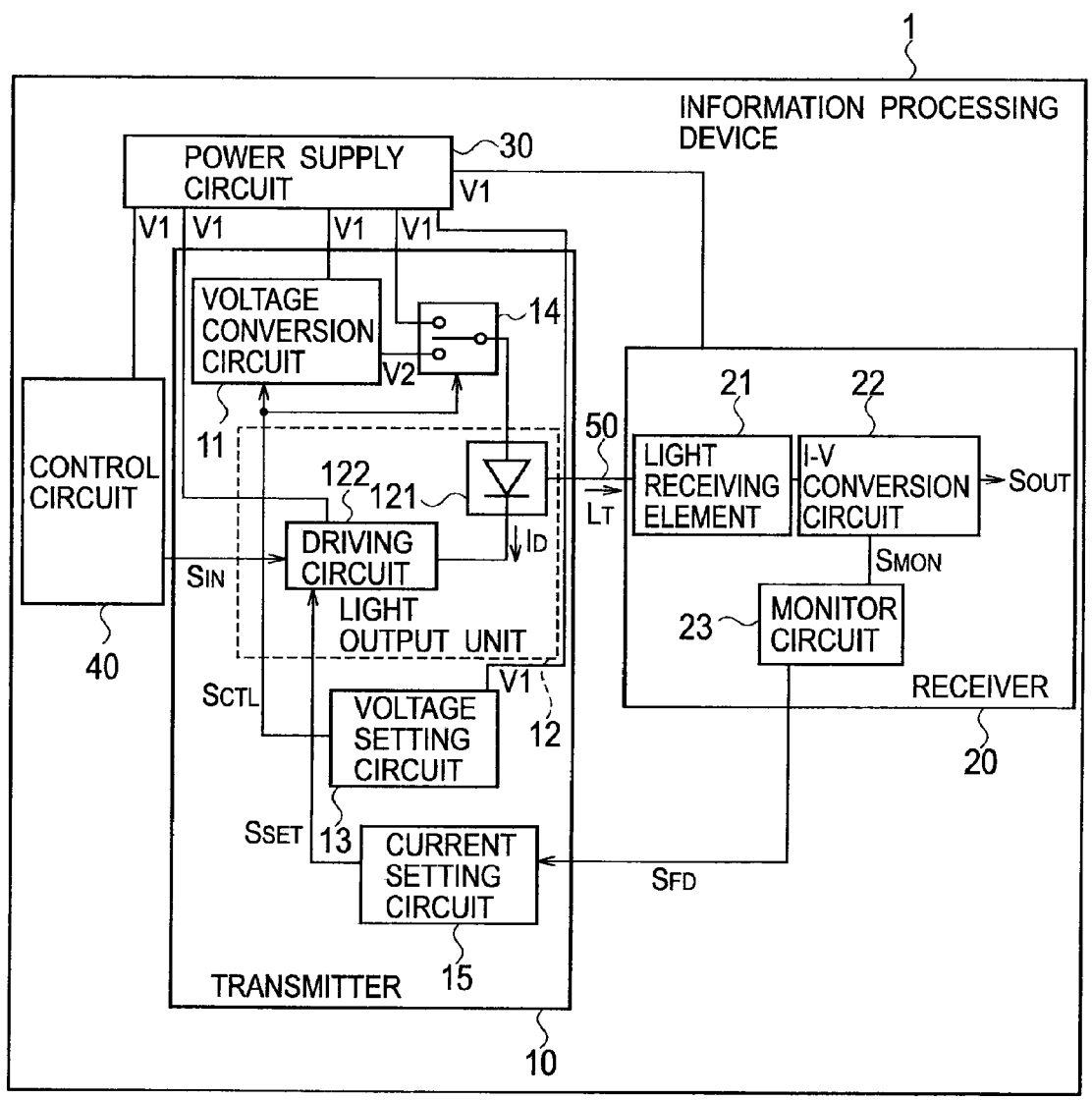
FIG. 19 is a schematic view showing still another configuration of the transmitter according to the third embodiment of the present invention.

As shown in FIG. 19, the monitor setting circuit 13 may monitor the supply voltage V1 instead of the terminal voltage $V_M$ to maintain the voltage necessary for operation of the driving circuit 122. The voltage setting circuit 13 functions as a supply voltage detection circuit monitoring the supply voltage V1 and controls both the drive voltage V2 and the operation of the switch 14. This allows the transmitter 10 shown in FIG. 19 to output the optical signal $L_T$ in an optimal operating condition even when the supply voltage V1 supplied from the power supply circuit 30 varies. The voltage setting circuit 13 monitoring the supply voltage V1 can be the same circuit shown in FIG. 12.

<Modification>

Figure 20:
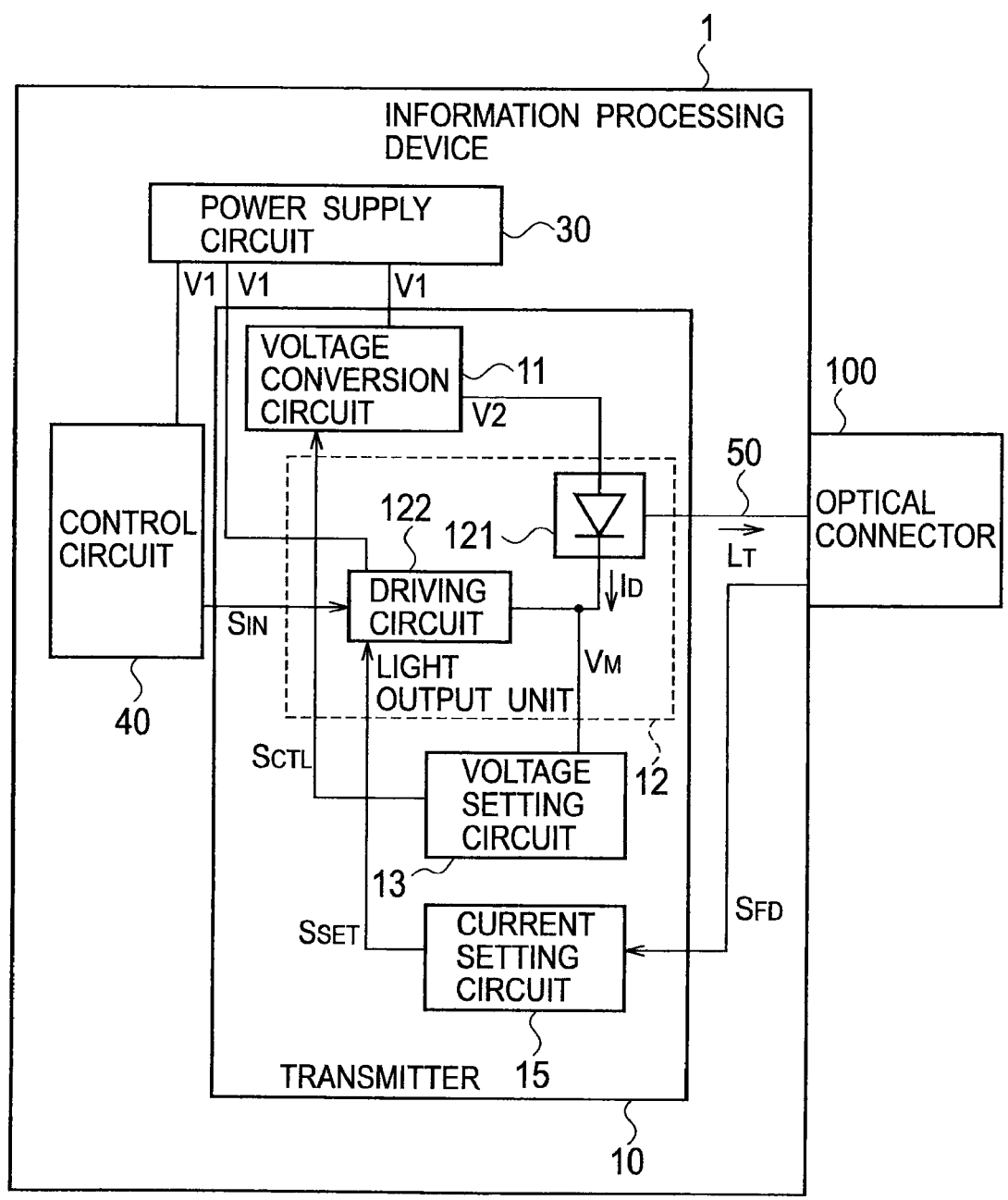
FIG. 20 is a schematic view showing a modification of the information processing device including the transmitter according to the third embodiment of the present invention.

FIG. 20 shows a modification of the information processing device 1 including the transmitter 10 according to the third embodiment of the present invention. The information processing device 1 shown in FIG. 14 incorporates the transmitter 10 and receiver 20 mounted on a same substrate, and optical transmission by the transmitter 10 is performed within the substrate. On the other hand, FIG. 20 shows an example where the receiver 20 is not mounted on the substrate where the transmitter 10 is mounted and the optical connector 100 is arranged in the substrate. The optical signal $L_T$ outputted from the transmitter 10 is transmitted through the optical transmission path 50 to the optical connector 100. The optical connector 100 can be connected to another substrate directly or through the optical transmission path 50. FIG. 20 shows an example where the transmitter 10 is used for the optical transmission between the substrates. The current setting circuit 15 receives the feedback signal $S_{FD}$ through the optical connector 100.

With the transmitter 10 according to the modification of the third embodiment of the present invention, which is shown in FIG. 20, it is possible to provide the information processing device 1 capable of adjusting the drive current $I_D$ against the changes in optical output and received light level of the receiver 20 due to external factors in addition to the internal factors including the temperature dependence, deterioration due to aging, and variation in internal resistance.

Other Embodiments

It should not be understood that the description and the drawings, which form a part of the disclosure of the above-described first, second and third embodiments, limit this invention. From this disclosure, a variety of alternative embodiments, examples and operation technologies will be obvious for those skilled in the art.

In the above description of the first to third embodiments, the voltage conversion circuit 11 is a voltage increasing circuit. However, when the supply voltage V1 is higher than the drive voltage V2, the voltage conversion circuit may be a voltage decreasing circuit. The parts of the information processing device 1 other than the transmitter 10 can be shared regardless of the value of the drive voltage V2 necessary for operating the light emitting element 121.

As described above, it is obvious that the present invention includes various embodiments and the like not described above. Accordingly, the technical scope of the present invention is determined by only the invention elements according to claims appropriate from the viewpoint of the above explanation.

What is claimed is:

1. A transmitter comprising:
    a voltage conversion circuit configured to convert supply voltage externally supplied into drive voltage and output the drive voltage; and
    an optical output unit configured to be supplied with the drive voltage and output an optical signal, the optical output unit comprises: a light emitting element configured to be supplied with the drive voltage; and a driving circuit configured to set drive current of the light emitting element;
    a voltage setting circuit configured to control the voltage conversion circuit according to terminal voltage of the light emitting element for setting the drive voltage; and
    a current setting circuit configured to receive an external feedback signal and set the drive current of the light emitting element according to the feedback signal,
    wherein the voltage conversion circuit and the optical output unit are included in a same module,
    wherein the current setting circuit controls the driving circuit for setting the drive curs ent of the light emitting element.

2. The transmitter of claim 1, wherein the voltage setting circuit monitors voltage at a terminal of the light emitting element, the terminal being connected to the driving circuit.

3. The transmitter of claim 1, wherein the voltage setting circuit monitors the supply voltage.

4. The transmitter of claim 1, wherein the light emitting element is a semiconductor laser.

5. The transmitter of claim 1, wherein the voltage conversion circuit and the optical output unit are mounted on a same package.

6. The transmitter of claim 1, wherein the drive voltage is higher than the supply voltage.

7. The transmitter of claim 1, further comprising a connector connectable to an external device, wherein the optical output unit outputs the optical signal to the connector.

8. An information processing device comprising:
    a transmitter comprising:
        a voltage conversion circuit configured to convert supply voltage externally supplied into drive voltage and output the drive voltage;
        an optical output unit configured to be supplied with the drive voltage and output an optical signal;
        a voltage setting circuit configured to control the voltage conversion circuit according to terminal voltage of the light emitting element for setting the drive voltage; and
        a current setting circuit configured to receive an external feedback signal and set the drive current of the light emitting element according to the feedback signal; and
    a receiver comprising:
        a light receiving element configured to receive the optical signal; and
        a monitor circuit configured to send the feedback signal to the current setting circuit according to conducting current of the light receiving element.

9. The information processing device of claim 8, wherein the current setting circuit controls the driving circuit for setting the drive current of the light emitting element.

10. The information processing device of claim 8, wherein the current setting circuit controls the voltage conversion circuit for setting the drive current of the light emitting element.

11. The information processing device of claim 8, further comprising a circuit configured to be controlled by the voltage setting circuit and supply the supply voltage to the light emitting element as the drive voltage.

12. The information processing device of claim 8, wherein the light emitting element is a semiconductor laser.

13. The information processing device of claim 8, wherein the drive voltage is higher than the supply voltage.

14. A transmitter comprising:
a voltage conversion circuit configured to convert supply voltage externally supplied into drive voltage and output the drive voltage; and
an optical output unit configured to be supplied with the drive voltage and output an optical signal, the optical output unit comprises: a light emitting element configured to be supplied with the drive voltage; and a driving circuit configured to set drive current of the light emitting element;
a voltage setting circuit configured to control the voltage conversion circuit according to terminal voltage of the light emitting element for setting the drive voltage; and
a circuit configured to be controlled by the voltage setting circuit and supply the supply voltage to the light emitting element as the drive voltage,
wherein the voltage conversion circuit and the optical output unit are included in a same module,
wherein when the supply voltage is supplied to the light emitting element, the operation of the voltage conversion circuit is controlled and stopped by the voltage setting circuit.

15. The transmitter of claim 14, wherein the voltage setting circuit monitors voltage at a terminal of the light emitting element, the terminal being connected to the driving circuit.

16. The transmitter of claim 14, wherein the voltage setting circuit monitors the supply voltage.

17. The transmitter of claim 14, wherein the light emitting element is a semiconductor laser.

18. The transmitter of claim 14, wherein the voltage conversion circuit and the optical output unit are mounted on a same package.

19. The transmitter of claim 14, wherein the drive voltage is higher than the supply voltage.

20. The transmitter of claim 14, further comprising a connector connectable to an external device, wherein the optical output unit outputs the optical signal to the connector.

* * * * *